US008273489B2

(12) United States Patent
Ukai et al.

(10) Patent No.: US 8,273,489 B2
(45) Date of Patent: Sep. 25, 2012

(54) HYDROGEN GENERATOR AND FUEL CELL SYSTEM INCLUDING THE SAME

(75) Inventors: Kunihiro Ukai, Nara (JP); Akira Maenishi, Osaka (JP); Yuji Mukai, Osaka (JP); Toru Nakamura, Osaka (JP); Masaya Tsujimoto, Osaka (JP); Shingo Nagatomo, Osaka (JP)

(73) Assignees: Fuji Electric Co., Ltd., Kawasaki-shi (JP); Panasonic Corporation, Osaka (JP)

( * ) Notice: Subject to any disclaimer, the term of this patent is extended or adjusted under 35 U.S.C. 154(b) by 886 days.

(21) Appl. No.: 12/304,147

(22) PCT Filed: Jun. 12, 2007

(86) PCT No.: PCT/JP2007/061831
§ 371 (c)(1),
(2), (4) Date: Dec. 10, 2008

(87) PCT Pub. No.: WO2007/145218
PCT Pub. Date: Dec. 21, 2007

(65) Prior Publication Data
US 2009/0317671 A1    Dec. 24, 2009

(30) Foreign Application Priority Data
Jun. 12, 2006 (JP) .................................. 2006-162614

(51) Int. Cl.
*H01M 8/06* (2006.01)
*F28D 21/00* (2006.01)
*G05D 7/00* (2006.01)
(52) U.S. Cl. .................... 429/423; 422/206; 422/111

(58) Field of Classification Search .................. 429/423; 422/206, 111
See application file for complete search history.

(56) References Cited

U.S. PATENT DOCUMENTS

| 7,232,471 | B2* | 6/2007 | Tamura et al. | .................... 48/61 |
| 2002/0042035 | A1* | 4/2002 | Komiya et al. | .............. 431/268 |
| 2004/0043262 | A1 | 3/2004 | Asou et al. | |
| 2004/0068933 | A1* | 4/2004 | Nakamura et al. | ............ 48/127.9 |
| 2004/0115494 | A1 | 6/2004 | Tamura et al. | |
| 2005/0026011 | A1* | 2/2005 | Suzuki et al. | ................... 429/19 |

FOREIGN PATENT DOCUMENTS
JP    2000-086203    3/2000
(Continued)

*Primary Examiner* — Lore Jarrett
(74) *Attorney, Agent, or Firm* — McDermott Will & Emery LLP

(57) ABSTRACT

A hydrogen generator (100*a*) includes: a heater (1) which combusts a mixture gas of combustion fuel and combustion air to generate a combustion gas; a preheat evaporator (6) which heats a raw material and water by the combustion gas generated by the heater to generate a mixture gas of the raw material and the water; a reformer (2) which generates a hydrogen-containing gas by causing the mixture gas generated by the preheat evaporator to pass through a reforming catalyst (2*a*) heated by the combustion gas; and a shift converter (3) which incorporates a shift catalyst (3*a*) which reduces, by a shift reaction, carbon monoxide contained in the hydrogen-containing gas generated by the reformer, and further includes a water trapping portion (7) which traps liquid water discharged from the preheat evaporator, and the hydrogen generator (100*a*) is configured to carry out heat exchange between the hydrogen-containing gas supplied from the reformer to the shift converter and the water in the water trapping portion.

12 Claims, 6 Drawing Sheets

FOREIGN PATENT DOCUMENTS

| | | |
|---|---|---|
| JP | 2002-187705 | 7/2002 |
| JP | 2002-356309 | 12/2002 |
| JP | 2003-112904 | 4/2003 |
| JP | 2003-252604 | 9/2003 |
| JP | 2004-071242 | 3/2004 |
| JP | 2004-149402 | 5/2004 |
| JP | 2004-220949 | 8/2004 |
| JP | 2005-225684 | 8/2005 |
| JP | 2005-306658 | 11/2005 |
| JP | 2007-015911 | 1/2007 |
| JP | 2007-055892 | 3/2007 |
| JP | 2007-099560 | 4/2007 |
| JP | 2007-157407 | 6/2007 |

* cited by examiner (a) (b)

(c) (d)

HYDROGEN GENERATOR AND FUEL CELL SYSTEM INCLUDING THE SAME

RELATED APPLICATIONS

This application is the U.S. National Phase under 35 U.S.C. §371 of International Application No. PCT/JP2007/061831, filed on Jun. 12, 2007, which in turn claims the benefit of Japanese Application No. 2006-162614, filed on Jun. 12, 2006, the disclosures of which Applications are incorporated by reference herein.

TECHNICAL FIELD

The present invention relates to a hydrogen generator which integrates: a reformer which generates a hydrogen-containing gas; a shift converter and a selective oxidizer which reduce the concentration of carbon monoxide; and a heater which heats the shift converter and the selective oxidizer, and a fuel cell system including the hydrogen generator.

BACKGROUND ART

A small-scale fuel cell system capable of carrying out high-efficiency electric power generation has been developed as a distributed power generating system capable of realizing high energy use efficiency, since it is easy to configure a system which utilizes heat energy generated when carrying out an electric power generating operation.

When carrying out the electric power generating operation, a hydrogen-containing gas containing hydrogen and an oxygen-containing gas containing oxygen are supplied to a fuel cell stack (hereinafter simply referred to as "fuel cell") provided as a main body of an electric power generating portion of the fuel cell system. Then, in the fuel cell, a predetermined electrochemical reaction proceeds by using the hydrogen contained in the supplied hydrogen-containing gas and the oxygen contained in the supplied oxygen-containing gas. By the progress of the predetermined electrochemical reaction, chemical energies of the hydrogen and the oxygen are directly converted into electric energy in the fuel cell. With this, the fuel cell system outputs electric power to a load.

Here, a system for supplying the hydrogen-containing gas necessary during the electric power generating operation of the fuel cell system is not usually arranged as an infrastructure. Therefore, in a conventional fuel cell system, a reformer is typically disposed with the fuel cell. The reformer uses a material gas, such as city gas or LPG, obtained from, for example, an existing fossil material infrastructure, and steam generated by a water evaporator to progress a steam-reforming reaction at a temperature of 600° C. to 700° C., thereby generating the hydrogen-containing gas. Generally, the hydrogen-containing gas obtained by the steam-reforming reaction contains a large amount of carbon monoxide and carbon dioxide which are derived from the material gas. Therefore, in the conventional fuel cell system, a shift converter and a selective oxidizer are typically disposed with the fuel cell and the reformer in order to reduce the concentration of the carbon monoxide contained in the hydrogen-containing gas generated in the reformer. The shift converter decreases the temperature of the hydrogen-containing gas and progress a water gas shift reaction at a temperature of 200° C. to 350° C. to reduce the concentration of the carbon monoxide, and the selective oxidizer progresses a selective oxidation reaction at a temperature of 100° C. to 150° C. to further reduce the concentration of the carbon monoxide. In the conventional fuel cell system, the reformer, the shift converter, and the selective oxidizer constitute a hydrogen generator. Each of the reformer, the shift converter, and the selective oxidizer is provided with a catalyst suitable for the steam-reforming reaction, the water gas shift reaction, or the selective oxidation reaction to progress the corresponding chemical reaction. For example, the reformer is provided with a Ru catalyst or a Ni catalyst, the shift converter is provided with a Cu—Zn catalyst or a precious metal based catalyst, and the selective oxidizer is provided with the Ru catalyst or the like.

In the hydrogen generator having the above configuration, generally, the temperatures of respective reactors need to be maintained at optimal temperatures to appropriately progress the chemical reactions of the respective reactors. In addition, in the hydrogen generator having the above configuration, an important object is to effectively utilize the heat energy necessary to maintain the temperatures of the respective reactors at the optimal temperatures.

Here, proposed is a hydrogen generator in which a cylindrical reformer, a water evaporator, a shift converter, and a selective oxidizer are concentrically disposed around the heater (see Patent Document 1 for example).

In the case of the configuration of the hydrogen generator described in Patent Document 1, generally, when supplying to the reformer the steam generated in the water evaporator disposed on an outer peripheral side of the reformer, the flow of the steam supplied from the water evaporator is changed from an axial direction of the water evaporator to a circumferential direction thereof. Because of this, the configuration of a steam passage becomes complex. Therefore, for example, a mixture gas supplying pipe which connects the steam passage and an entrance of the reformer needs to extend in a radial direction, and a connection portion where the mixture gas supplying pipe and the reformer extending in the axial direction are connected to each other needs to be subjected to a piping installation, such as welding. The piping installation of the steam passage may increase the cost of the hydrogen generator and deteriorate the durability performance of the hydrogen generator.

Here, proposed is a hydrogen generator in which a tubular water evaporator and a tubular reformer are arranged to be lined up in the same axial direction (see Patent Document 2 for example).

Patent Document 1: Japanese Laid-Open Patent Application Publication 2002-187705
Patent Document 2: Japanese Laid-Open Patent Application Publication 2005-225684

DISCLOSURE OF THE INVENTION

Problems to be Solved by the Invention

In order to suppress the increase in cost of the hydrogen generator and the deterioration of the durability performance of the hydrogen generator due to the complex configuration of the steam passage, it is assumed that the configuration in which the tubular water evaporator and the tubular reformer are arranged to be lined up in the same axial direction as in Patent Document 2 is incorporated in the hydrogen generator described in Patent Document 1.

However, in this case, since the water evaporator is disposed above the reformer, liquid water which did not evaporate in the water evaporator may be directly supplied to the reforming catalyst in the reformer. In this case, since the reforming catalyst is locally and rapidly cooled down, this may cause the inhibition of the reforming reaction and the destruction of the reforming catalyst.

The present invention was made to solve the above problems of the conventional hydrogen generator and the fuel cell system including the conventional hydrogen generator, and an object of the present invention is to provide a hydrogen generator which suppresses the increase in complexity of the steam passage, improves the durability performance of the steam passage, and reduces the possibility of occurrence of the inhibition of the reforming reaction and the destruction of the reforming catalyst which are caused by the liquid water which did not evaporate in the water evaporator and is supplied from the water evaporator to the reforming catalyst, and a fuel cell system including the hydrogen generator.

Means for Solving the Problems

In order to solve the above problems, a hydrogen generator according to the present invention includes: a heater which combusts a mixture gas of combustion fuel and combustion air to generate a combustion gas; an annular preheat evaporator which heats a raw material and water by the combustion gas generated by said heater to generate a mixture gas of the raw material and steam; and an annular reformer which is disposed under the preheat evaporator and generates a hydrogen-containing gas by causing the mixture gas generated by the preheat evaporator to pass through a reforming catalyst heated by the combustion gas, and the hydrogen generator further includes a water trapping portion which traps liquid water discharged from the preheat evaporator.

With this configuration, since the liquid water discharged from the preheat evaporator is trapped by the water trapping portion, it is possible to reduce the possibility of occurrence of the inhibition of the reforming reaction and the destruction of the catalyst which occur when the liquid water is directly supplied to the reforming catalyst filled in the reformer, and the reforming catalyst is locally and rapidly cooled down.

In this case, the hydrogen generator further includes a shift converter which is disposed around an outer periphery of the preheat evaporator and contains a shift catalyst which reduces, by a shift reaction, carbon monoxide contained in the hydrogen-containing gas generated by the reformer, and the hydrogen generator is configured to carry out heat exchange between the hydrogen-containing gas supplied from the reformer to the shift converter and the liquid water in the water trapping portion.

With this configuration, the heat exchange is carried out between the liquid water in the water trapping portion and the hydrogen-containing gas supplied to the shift converter, and the temperature of the hydrogen-containing gas supplied to the shift converter can be preferably decreased by this heat exchange.

In this case, each of the preheat evaporator, the water trapping portion, the reformer, and the shift converter is disposed outside the heater so as to have a tubular shape; the shift converter is disposed to surround the preheat evaporator; and the preheat evaporator, the water trapping portion, and the reformer are connected to one another such that the mixture gas is supplied from the preheat evaporator through the water trapping portion to the reformer, and the hydrogen generator is configured to cause the hydrogen-containing gas, generated by the reformer, to contact the water trapping portion before the hydrogen-containing gas is supplied to the shift converter.

With this configuration, the heat exchange is carried out between the liquid water in the water trapping portion and the hydrogen-containing gas supplied to the shift converter, and the temperature of the hydrogen-containing gas supplied to the shift converter can be preferably decreased by this heat exchange.

In this case, a supply port of the raw material and a supply port of the water are formed at one end of the preheat evaporator which is opposite to another end to which the water trapping portion is connected.

With this configuration, since the supply port of the raw material and the supply port of the water are formed at one end of the preheat evaporator which is opposite to another end to which a heat exchanger is connected, the flow direction of the mixture gas of the raw material and the steam in the preheat evaporator substantially coincides with the direction of gravitational force. Moreover, when the hydrogen generator is formed such that the reformer is placed under the preheat evaporator in the direction of gravitational force, the mixture gas of the raw material and the steam generated above the preheat evaporator in the direction of gravitational force does not remain in the preheat evaporator but can be efficiently supplied to the reformer which is placed under the preheat evaporator in the direction of gravitational force.

In the above case, the hydrogen generator further includes: a combustion air supplying unit which supplies the combustion air to the heater; a water supplying unit which supplies the water to the preheat evaporator; a temperature detector which detects a temperature of the shift catalyst incorporated in the shift converter; and a control unit, wherein the control unit controls based on the temperature of the shift catalyst detected by the temperature detector at least one of a supply amount of the water supplied from the water supplying unit to the preheat evaporator and a supply amount of the combustion air supplied from the combustion air supplying unit to the heater.

With this configuration, the control unit controls based on the temperature of the shift catalyst detected by the temperature detector at least one of the supply amount of the water supplied from the water supplying unit to the preheat evaporator and the supply amount of the combustion air supplied from the combustion air supplying unit to the heater. This changes the temperature of the preheat evaporator. Thus, it is possible to control the temperature of the shift converter disposed around an outer periphery of the preheat evaporator portion.

In this case, the hydrogen generator further includes a storage unit which contains information regarding an upper limit temperature and a lower limit temperature associated with temperature control of the shift catalyst, wherein the control unit causes the water supplying unit to increase the supply amount of the water supplied to the preheat evaporator when the temperature detected by the temperature detector becomes the upper limit temperature or more, and causes the water supplying unit to decrease the supply amount of the water supplied to the preheat evaporator when the temperature detected by the temperature detector becomes the lower limit temperature or less.

With this configuration, by controlling the supply amount of the water supplied from the water supplying unit to the preheat evaporator, the temperature of the preheat evaporator changes, or the amount of the liquid water in the water trapping portion changes. This changes the amount of the heat transferred from the shift converter to the preheat evaporator or the amount of the heat exchange between the hydrogen-containing gas supplied to the shift converter and the water trapping portion. Thus, it is possible to control the temperature of the shift catalyst.

In this case, the storage unit further contains information regarding an upper limit supply amount and a lower limit supply amount associated with control of the supply amount of the water; and the control unit determines that an abnormality has occurred when the supply amount of the water supplied from the water supplying unit to the preheat evaporator becomes the upper limit supply amount or more or when the supply amount of the water supplied from the water supplying unit to the preheat evaporator becomes the lower limit supply amount or less.

With this configuration, since the control unit determines that the abnormality has occurred when the supply amount of the water supplied from the water supplying unit to the preheat evaporator becomes the upper limit supply amount or more or when the supply amount of the water supplied from the water supplying unit to the preheat evaporator becomes the lower limit supply amount or less, the operator or the user can realize the occurrence of the abnormality.

Moreover, in the above case, the hydrogen generator further includes a storage unit which contains information regarding an upper limit temperature and a lower limit temperature associated with temperature control of the shift catalyst, wherein the control unit causes the combustion air supplying unit to decrease the supply amount of the combustion air supplied to the heater when the temperature detected by the temperature detector is not less than the upper limit temperature, and causes the combustion air supplying unit to increase the supply amount of the combustion air supplied to the heater when the temperature detected by the temperature detector is not more than the lower limit temperature.

With this configuration, since the amount of the heat transferred from the combustion gas to the preheat evaporator changes by controlling the supply amount of the combustion air supplied from the combustion air supplying unit to the heater, the temperature of the preheat evaporator changes. This changes the amount of the heat transferred from the shift converter to the preheat evaporator. Thus, it is possible to control the temperature of the shift catalyst.

In this case, the storage unit further contains information regarding an upper limit supply amount and a lower limit supply amount associated with control of the supply amount of the combustion air; and the control unit determines that an abnormality has occurred when the supply amount of the combustion air supplied from the combustion air supplying unit to the heater becomes the upper limit supply amount or more or when the supply amount of the combustion air supplied from the combustion air supplying unit to the heater becomes the lower limit supply amount or less.

With this configuration, since the control unit determines that the abnormality has occurred when the supply amount of the combustion air supplied from the combustion air supplying unit to the heater becomes the upper limit supply amount or more or when the supply amount of the combustion air supplied from the combustion air supplying unit to the heater becomes the lower limit supply amount or less, the operator or the user can realize the occurrence of the abnormality.

Moreover, in the above case, the hydrogen generator further includes a storage unit which contains information regarding an upper limit temperature and a lower limit temperature associated with temperature control of the shift catalyst and information regarding an upper limit supply amount and a lower limit supply amount associated with control of the supply amount of the water, wherein the control unit causes the combustion air supplying unit to decrease the supply amount of the combustion air supplied to the heater when the temperature of the shift catalyst is not less than the upper limit temperature and the supply amount of the water supplied from the water supplying unit to the preheat evaporator is not more than the upper limit supply amount, and causes the combustion air supplying unit to increase the supply amount of the combustion air supplied to the heater when the temperature of the shift catalyst is not more than the lower limit temperature and the supply amount of the water supplied from the water supplying unit to the preheat evaporator is not more than the lower limit supply amount.

Or, in the above case, the hydrogen generator further includes a storage unit which contains information regarding an upper limit temperature and a lower limit temperature associated with temperature control of the shift catalyst and information regarding an upper limit supply amount and a lower limit supply amount associated with control of the supply amount of the combustion air, wherein the control unit causes the water supplying unit to increase the supply amount of the water supplied to the preheat evaporator when the temperature of the shift catalyst is not less than the upper limit temperature and the supply amount of the combustion air supplied from the combustion air supplying unit to the heater is not more than the lower limit supply amount, and causes the water supplying unit to decrease the supply amount of the water supplied to the preheat evaporator when the temperature of the shift catalyst is not more than the lower limit temperature and the supply amount of the combustion air supplied from the combustion air supplying unit to the heater is not less than the upper limit supply amount.

With this configuration, since the temperature of the shift catalyst incorporated in the shift converter is controlled by controlling both the supply amount of the water supplied from the water supplying unit to the preheat evaporator and the supply amount of the combustion air supplied from the combustion air supplying unit to the heater, the temperature control of the shift catalyst can be further surely carried out during the operation of a fuel cell system.

Meanwhile, a fuel cell system according to the present invention includes at least: the characteristic hydrogen generator according to the present invention; and a fuel cell which generates electric power using the hydrogen-containing gas supplied from the hydrogen generator and an oxygen-containing gas.

With this configuration, since the fuel cell system includes the characteristic hydrogen generator according to the present invention and the fuel cell which uses the hydrogen-containing gas supplied from the hydrogen generator and the oxygen-containing gas to generate electric power, it is possible to reduce the possibility of occurrence of the inhibition of the reforming reaction and the destruction of the catalyst which occur when the liquid water is directly supplied to the reforming catalyst filled in the reformer and the reforming catalyst is locally and rapidly cooled down, and supply the hydrogen-containing gas having a stable composition. With this, it is possible to provide the fuel cell system which can continuously carry out the stable operation.

Effects of the Invention

In accordance with the hydrogen generator according to the present invention, since the liquid water supplied from the preheat evaporator is trapped by the water trapping portion, the possibility of occurrence of the inhibition of the reforming reaction and the destruction of the catalyst, which are caused since the liquid water is directly supplied to the reforming catalyst filled in the reformer and the reforming catalyst is locally and rapidly cooled down, is reduced, so that the hydrogen can be generated stably.

Moreover, in accordance with the fuel cell system including the hydrogen generator according to the present invention, it is possible to provide the fuel cell system by which the hydrogen generator operates stably, a high-quality hydrogen-containing gas having a stable composition is stably supplied to the fuel cell, and the electric power generating operation can be stably carried out.

Figure 1:
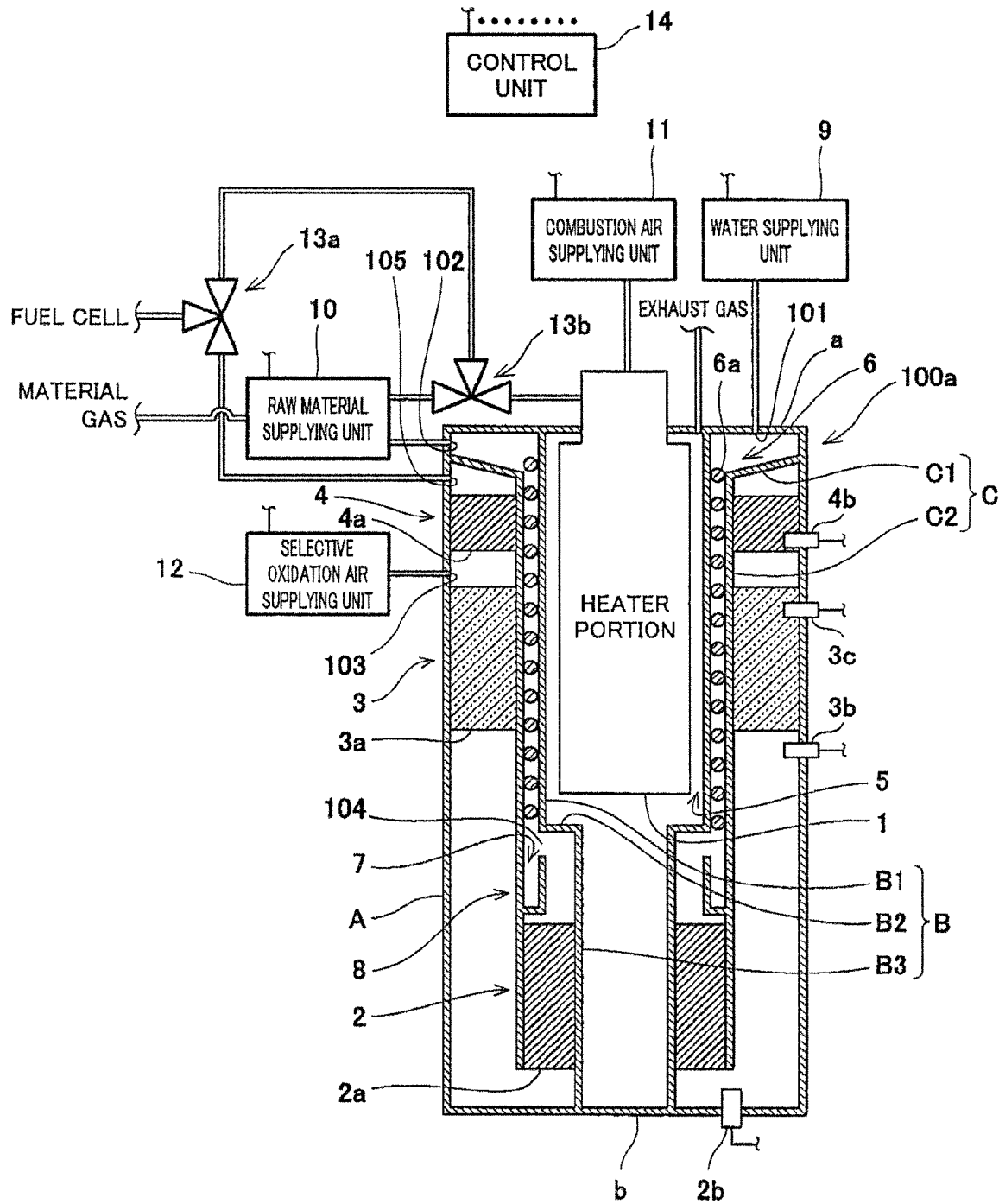
FIG. 1 is a block diagram and a cross-sectional view schematically showing a first configuration of a hydrogen generator according to Embodiment 1 of the present invention and an additional configuration for driving the hydrogen generator.

EXPLANATION OF REFERENCE NUMBERS 1 heater portion
2 reformer portion
2a reforming catalyst
2b temperature detector portion
3 shift converter portion
3a shift catalyst
3b, 3c temperature detector portion
4 selective oxidizer portion
4a selective oxidation catalyst
4b temperature detector portion
5 combustion gas passage
6 preheat evaporator portion
6a evaporator rod
7 water trapping portion
8 heat exchanger portion
9 water supplying unit
10 raw material supplying unit
11 combustion air supplying unit
12 selective oxidation air supplying unit
13a, 13b passage switching valve
14 control unit
a upper wall portion
b lower wall portion
A outer wall portion
B inner wall portion
B1 first inner wall portion
B2 second inner wall portion
B3 third inner wall portion
C partition wall portion
C1 first partition wall portion
C2 second partition wall portion
C3 third partition wall portion
C4 fourth partition wall portion
P1 evaporator portion
P2 heat exchanger portion
100a, 100b hydrogen generator 101 water supplying port
102 raw material supplying port
103 air supplying port
104 gap
105 fuel gas output port

BEST MODE FOR CARRYING OUT THE INVENTION

Hereinafter, the best mode for carrying out the present invention will be explained in reference to the drawings.

Embodiment 1

First, a basic configuration of a hydrogen generator according to Embodiment 1 of the present invention will be explained.

FIG. 1 is a block diagram and a cross-sectional view schematically showing a first configuration of the hydrogen generator according to Embodiment 1 of the present invention and an additional configuration for driving the hydrogen generator.

As shown in FIG. 1, a hydrogen generator 100a according to the present embodiment includes a cylindrical heater portion 1, a cylindrical reformer portion 2, a cylindrical shift converter portion 3, and a cylindrical selective oxidizer portion 4. The heater portion 1 combusts a material gas, such as city gas or LPG, obtained from an existing fossil material infrastructure, or a hydrogen-containing gas containing carbon monoxide, which cannot be supplied to a fuel cell, at a predetermined concentration or more to heat the reformer portion 2, the shift converter portion 3, and the selective oxidizer portion 4. The reformer portion 2, the shift converter portion 3, and the selective oxidizer portion 4 are concentrically and integrally disposed around the heater portion 1.

Specifically, as shown in FIG. 1, the hydrogen generator 100a includes: a cylindrical outer wall portion A which has a predetermined diameter and whose upper opening and lower opening are closed by an upper wall portion a and a lower wall portion b, respectively; and a substantially cylindrical inner wall portion B which has a smaller diameter than the outer wall portion A and is concentrically disposed in the outer wall portion A such that upper and lower ends thereof are connected to the upper wall portion a and the lower wall portion b, respectively, which are disposed on an upper side and a lower side, respectively, of the outer wall portion A.

The inner wall portion B includes: a cylindrical first inner wall portion B1 which extends from the upper wall portion a to a predetermined position in a vertically downward direction; a ring-shaped second inner wall portion B2 whose outer edge portion is connected to a lower end of the first inner wall portion B1; and a cylindrical third inner wall portion B3 whose upper end is connected to an inner edge portion of the second inner wall portion B2 and which extends to the lower wall portion b in the vertically downward direction.

In addition, as shown in FIG. 1, the hydrogen generator 100a includes a substantially cylindrical partition wall portion C between the outer wall portion A and the inner wall portion B.

Here, an upper end of the partition wall portion C is connected to an upper portion of the outer wall portion A which portion is spaced apart from the upper wall portion a by a predetermined distance. The partition wall portion C includes: an inverted cone-shaped first partition wall portion C1 which inclines at a predetermined angle and extends from the upper portion of the outer wall portion A to a predetermined position in the vicinity of the inner wall portion B; and a cylindrical second partition wall portion C2 which extends from a lower end of the first partition wall portion C1 to a predetermined position in the vertically downward direction.

In an upper portion of a columnar region surrounded by the inner wall portion B, the cylindrical heater portion 1 which heats a reforming catalyst 2a of the reformer portion 2 via the third inner wall portion B3 is disposed such that a central axis of the heater portion 1 coincides with a central axis of the hydrogen generator 100a, and a combustion gas passage 5 is formed between a wall portion of the heater portion 1 and the first inner wall portion B1. The heater portion 1 includes a combustion burner, not shown in FIG. 1, and uses combustion air, which is supplied from a below-described combustion air supplying unit 11 including a sirocco fan or the like, to burn a part of the material gas which is supplied from a below-described raw material supplying unit 10 or a hydrogen-containing gas which is supplied through below-described passage switching valves 13a and 13b and contains carbon monoxide, which cannot be supplied to the fuel cell, at a predetermined concentration or more. Thus, the heater portion 1 heats the reforming catalyst 2a of the reformer portion 2 to a temperature suitable for the progress of the steam-reforming reaction and maintains the temperature. Here, the present embodiment is configured such that in order to improve a heat efficiency when generating the hydrogen-containing gas, the combustion gas discharged from the heater portion 1 heats the reforming catalyst 2a of the reformer portion 2, and then, flows through the combustion gas passage 5 to heat a below-described preheat evaporator portion 6. Note that the combustion gas discharged from the heater portion 1 and used to heat the reforming catalyst 2a of the reformer portion 2 and the preheat evaporator portion 6 is discharged as an exhaust gas from an exhaust gas outlet port, formed at an upper portion of the hydrogen generator 100a, to an outside of the hydrogen generator 100a.

As shown in FIG. 1, the hydrogen generator 100a includes the cylindrical reforming catalyst 2a between a predetermined lower portion of the third inner wall portion B3 and the second partition wall portion C2. The reforming catalyst 2a is formed by a Ru based catalyst in the present embodiment, and progresses the steam-reforming reaction between steam and a raw material or the material gas, such as a hydrocarbon based component (city gas, LPG, or the like), an alcohol (methanol, or the like), or a naphtha component. With this, the hydrogen-containing gas containing hydrogen as a major component and carbon monoxide as a subcomponent is generated. The reformer portion 2 according to the present embodiment includes the reforming catalyst 2a and a temperature detector portion 2b which detects the temperature of the hydrogen-containing gas discharged from the reforming catalyst 2a to indirectly detect the temperature of the reforming catalyst 2a.

Moreover, as shown in FIG. 1, in the hydrogen generator 100a, a cylindrical shift catalyst 3a and a cylindrical selective oxidation catalyst 4a are disposed between a predetermined upper portion of the outer wall portion A and the second partition wall portion C2. Here, the shift catalyst 3a is disposed at a predetermined position (that is, disposed upstream of the selective oxidation catalyst 4a in the flow direction of the hydrogen-containing gas) which is closer to the reforming catalyst 2a than the selective oxidation catalyst 4a in a cylindrical region surrounded by the predetermined portion of the outer wall portion A and the second partition wall portion C2. Meanwhile, the selective oxidation catalyst 4a is disposed at a predetermined position (that is, disposed downstream of the shift catalyst 3a in the flow direction of the hydrogen-containing gas) which is farther from the reforming catalyst 2a than the shift catalyst 3a in the cylindrical region. Moreover, the shift catalyst 3a and the selective oxidation catalyst 4a are spaced apart from each other by a predetermined distance. Then, an air supplying port 103 is formed to be communicated with a space between the shift catalyst 3a and the selective oxidation catalyst 4a. Moreover, a fuel gas output port 105 is formed on the outer wall portion A to be communicated with a space located above the selective oxidation catalyst 4a.

The shift catalyst 3a is formed by a Cu—Zn based catalyst in the present embodiment, and mainly progresses the water gas shift reaction using the steam so that the concentration of the carbon monoxide contained in the hydrogen-containing gas generated in the reformer portion 2 is reduced to a predetermined concentration or lower. The shift converter portion 3 according to the present embodiment includes the shift catalyst 3a, a temperature detector portion 3b which detects the temperature of the hydrogen-containing gas introduced into the shift catalyst 3a to indirectly detect the temperature of the shift catalyst 3a, and a temperature detector portion 3c which directly detects the temperature of the shift catalyst 3a. The selective oxidation catalyst 4a is formed by a Ru based catalyst in the present embodiment, and mainly progresses the selective oxidation reaction, which uses the air supplied from a below-described selective oxidation air supplying unit 12 through the air supplying port 103, so that the concentration of the carbon monoxide contained in the hydrogen-containing gas whose carbon monoxide concentration has been reduced in the shift converter portion 3 is further reduced to a predetermined concentration or lower. The hydrogen-containing gas passed through the selective oxidation catalyst 4a is output through the fuel gas output port 105. The selective oxidizer portion 4 according to the present embodiment includes the selective oxidation catalyst 4a and a temperature detector portion 4b which directly detects the temperature of the selective oxidation catalyst 4a.

Next, the configuration of the preheat evaporator portion and the configuration of a heat exchanger portion in the hydrogen generator according to Embodiment 1 of the present invention will be explained.

In the hydrogen generator 100a according to the present embodiment, the preheat evaporator portion 6 which evaporates the water supplied from a below-described water supplying unit 9 is formed in a predetermined region surrounded by the upper portion of the outer wall portion A, the end portion of the upper wall portion a, the upper portion of the inner wall portion B, and the first and second partition wall portions C1 and C2 of the partition wall portion C. In the preheat evaporator portion 6, an evaporator rod 6a is disposed in a cylindrical region between the first inner wall portion B1 of the inner wall portion B and a predetermined portion of the second partition wall portion C2 which is opposed to the first inner wall portion B1. In the present embodiment, the evaporator rod 6a extends in a vertical direction from an upper end toward a lower end of the second partition wall portion C2 of the partition wall portion C so as to spirally turn around the heater portion 1 in the cylindrical region located between the inner wall portion B and the second partition wall portion C2. Moreover, the evaporator rod 6a is disposed such that an outer peripheral portion thereof contacts both the inner wall portion B and the second partition wall portion C2. A water supplying port 101 is formed on the upper wall portion a so as to be communicated with the preheat evaporator portion 6. To be specific, in the present embodiment, the preheat evaporator portion 6 is configured such that the water supplied from the water supplying unit 9 through the water supplying port 101 flows along the first partition wall portion C1 of the partition wall portion C, and flows down in the vertically downward direction along the evaporator rod 6a while spirally turning between the inner wall portion B and the second partition wall portion C2. In addition, the preheat evaporator portion 6 is configured such that a raw material supplying port 102 is formed on the outer wall portion A so as to be communicated with the preheat evaporator portion 6, and the material gas supplied from the below-described raw material supplying unit 10 through the raw material supplying port 102 is supplied to a space above the first partition wall portion C1 of the partition wall portion C and flows in the vertically downward direction in a space above the evaporator rod 6a while spirally turning between the inner wall portion B and the second partition wall portion C2. In the preheat evaporator portion 6, the material gas supplied from the raw material supplying unit 10 is heated to a predetermined temperature by the high-temperature combustion gas discharged from the heater portion 1, and is adequately mixed with the steam obtained by evaporating the water supplied from the water supplying unit 9. With this, a mixture gas of the material gas and the steam is generated in the preheat evaporator portion 6. The mixture gas of the material gas and the steam is then supplied to the reforming catalyst 2a of the reformer portion 2.

Moreover, as shown in FIG. 1, in the hydrogen generator 100a according to the present embodiment, a heat exchanger portion 8 is formed by a part of the second partition wall portion C2 of the partition wall portion C and a concave water trapping portion 7 which is formed in an annular shape on an inner side of the part of the second partition wall portion C2 over an entire periphery of the partition wall portion C. The heat exchanger portion 8 is configured such that the heat of the hydrogen-containing gas which is discharged from the reformer portion 2 and is to be supplied to the shift converter portion 3 is transferred by heat exchange from the shift converter portion 3 side to the preheat evaporator portion 6 side via the second partition wall portion C2. Here, the water trapping portion 7 is configured to trap the liquid water which spirally flowed along the evaporator rod 6a of the preheat evaporator portion 6, did not evaporate in the preheat evaporator portion 6, and is discharged from the preheat evaporator portion 6. Moreover, the second partition wall portion C2 of the partition wall portion C allows heat transfer therethrough between the liquid water which is contained in the water trapping portion 7 and the hydrogen-containing gas which is to be introduced into the shift converter portion 3. The mixture gas of the material gas and the steam generated in the preheat evaporator portion 6 does not remain in the heat exchanger portion 8 but is sequentially supplied to the reforming catalyst 2a of the reformer portion 2 through a predetermined gap 104 formed over an entire periphery between the heat exchanger portion 8 and the inner wall portion B.

As above, in the present embodiment, in the hydrogen generator 100a, the heater portion 1 is placed at a center thereof, the cylindrical preheat evaporator portion 6 is placed around the heater portion 1 on an upper side in a direction of gravitational force, and the cylindrical heat exchanger portion 8 and the cylindrical reformer portion 2 are placed on a lower side in the direction of gravitational force. Here, the combustion gas passage 5 through which the combustion gas discharged from the heater portion 1 flows is formed between the heater portion 1 and the preheat evaporator portion 6 in order to heat the preheat evaporator portion 6 after heating the reforming catalyst 2a of the reformer portion 2. Moreover, in the present embodiment, the heat exchanger portion 8 is placed at a boundary between a passage through which the mixture gas of the material gas and the steam flows and a passage through which the hydrogen-containing gas supplied to the shift converter portion 3 flows, and is configured such that the temperature of the hydrogen-containing gas which is to be supplied to the shift converter portion 3 can be suitably controlled via the second partition wall portion C2. Moreover, in the present embodiment, the shift converter portion 3 and the selective oxidizer portion 4 which reduce the concentration of the carbon monoxide contained in the hydrogen-containing gas generated in the reformer portion 2 are placed outside the preheat evaporator portion 6, and are configured such that the heat energy remaining in the shift converter portion 3 and the selective oxidizer portion 4 can be supplied to the preheat evaporator portion 6.

Moreover, in the present embodiment, since the liquid water supplied from the preheat evaporator 6 is surely trapped by the water trapping portion 7 formed at the heat exchanger 8, it is possible to prevent the inhibition of the reforming reaction and the destruction of the reforming catalyst 2a which occur when the liquid water is directly supplied to the reforming catalyst 2a filled in the reformer portion 2, and the reforming catalyst 2a is locally and rapidly cooled down.

Figure 2:
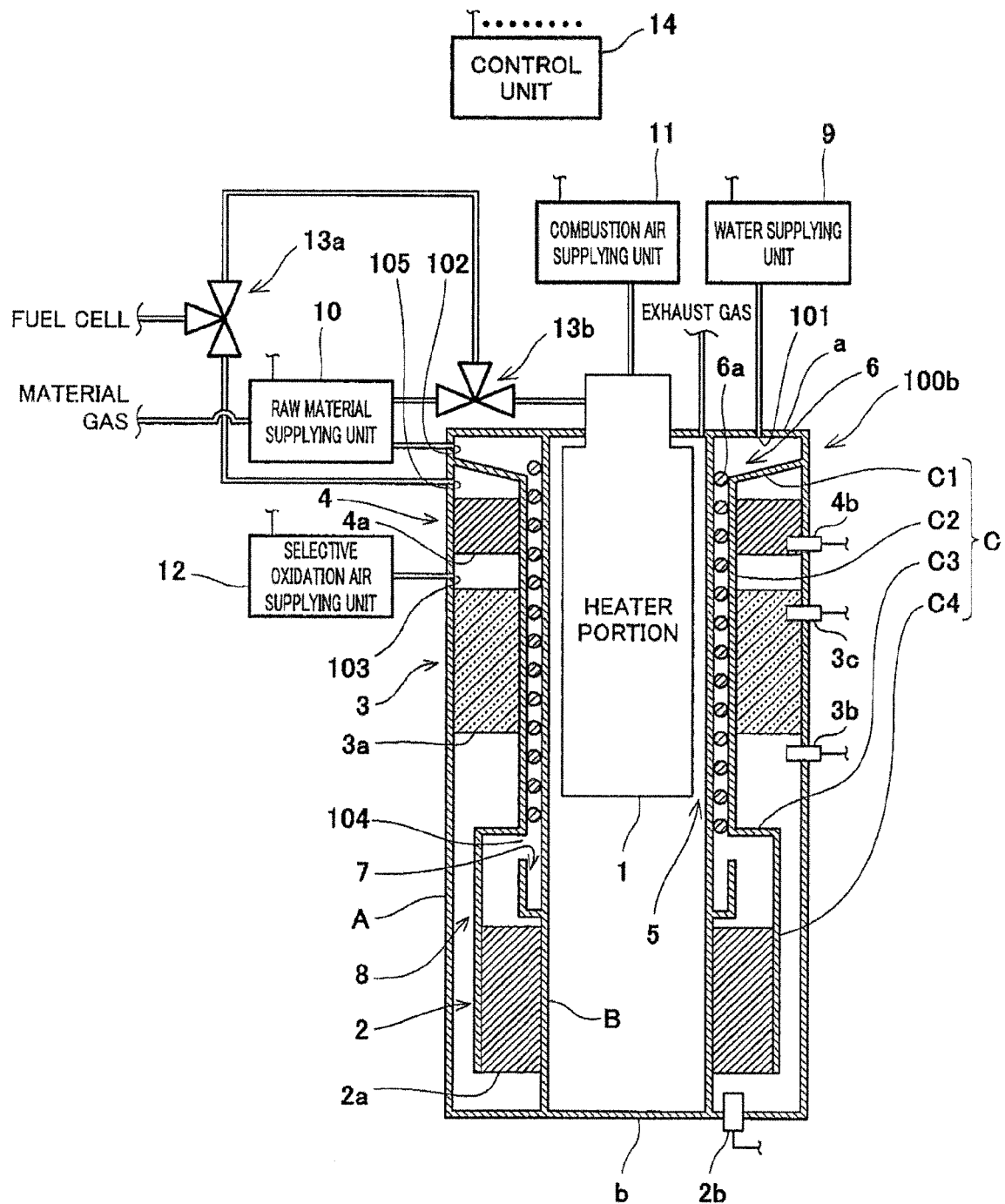
FIG. 2 is a block diagram and a cross-sectional view schematically showing a second configuration of the hydrogen generator according to Embodiment 1 of the present invention and an additional configuration for driving the hydrogen generator.

FIG. 2 is a block diagram and a cross-sectional view schematically showing a second configuration of the hydrogen generator according to Embodiment 1 of the present invention and an additional configuration for driving the hydrogen generator.

As shown in FIG. 2, the heat exchanger portion 8 and its peripheral components of a hydrogen generator 100b according to the present embodiment are slightly different from those of the hydrogen generator 100a.

Specifically, as with the hydrogen generator 100a, the hydrogen generator 100b according to the present embodiment includes the cylindrical outer wall portion A and the cylindrical inner wall portion B which has a smaller diameter than the outer wall portion A and is concentrically disposed in the outer wall portion A such that upper and lower ends thereof are connected to the upper wall portion a and the lower wall portion b, respectively, which are disposed on an upper side and lower side, respectively, of the outer wall portion A. Moreover, as with the hydrogen generator 100a, the hydrogen generator 100b includes the substantially cylindrical partition wall portion C between the outer wall portion A and the inner wall portion B.

The partition wall portion C includes: the inverted cone-shaped first partition wall portion C1 which inclines at a predetermined angle and extends from a connection portion where the first partition wall portion C1 and the outer wall portion A are connected to each other to a predetermined position in the vicinity of the inner wall portion B; the cylindrical second partition wall portion C2 which extends from a lower end of the first partition wall portion C1 to a predetermined position in the vertically downward direction; a ring-shaped third partition wall portion C3 whose inner edge portion is connected to a lower end of the second partition wall portion C2; and a cylindrical fourth partition wall portion C4 whose upper end is connected to an outer edge portion of the third partition wall portion C3 and extends in the vertically downward direction to a predetermined position in the vicinity of the lower wall portion b.

As shown in FIG. 2, in the hydrogen generator 100b according to the present embodiment, the heat exchanger portion 8 is formed by a part of the fourth partition wall portion C4 of the partition wall portion C and the concave water trapping portion 7 which is formed in an annular shape on an inner side of the part of the fourth partition wall portion C4 over an entire periphery of the inner wall portion B. In other words, the hydrogen generator 100b according to the present embodiment is configured such that a passage through which the mixture gas of the material gas and the steam flows is formed on an inner side of the fourth partition wall portion C4 of the partition wall portion C, and the water trapping portion 7 is placed inside the passage. As with the hydrogen generator 100a, the water trapping portion 7 of the hydrogen generator 100b is configured to trap the liquid water which spirally flowed along the evaporator rod 6a of the preheat evaporator portion 6, did not evaporate in the preheat evaporator portion 6, and is discharged from the preheat evaporator portion 6. Even with this configuration, as with the case of using the hydrogen generator 100a shown in FIG. 1, the temperature of the hydrogen-containing gas which is to be supplied to the shift converter portion 3 can be suitably controlled via the fourth partition wall portion C4. Other than these, the hydrogen generator 100b is similar in configuration to the hydrogen generator 100a.

Next, the additional configuration for driving the hydrogen generator according to Embodiment 1 of the present invention will be explained. In the following explanation, for convenience sake, the additional configuration for driving the hydrogen generator 100a will be explained.

As shown in FIG. 1, in order to drive the hydrogen generator 100a when carrying out the electric power generating operation, the fuel cell system according to the present embodiment includes: the water supplying unit 9 which supplies to the preheat evaporator portion 6 of the hydrogen generator 100a the water necessary when progressing the steam-reforming reaction; the raw material supplying unit 10 which supplies to the heater portion 1 and the preheat evaporator portion 6 of the hydrogen generator 100a the material gas, such as city gas or LPG, necessary when progressing the steam-reforming reaction; the combustion air supplying unit 11 which supplies to the heater portion 1 of the hydrogen generator 100a the combustion air necessary for the combustion of the city gas or the like in the combustion burner; and the selective oxidation air supplying unit 12 which supplies to the selective oxidizer portion 4 of the hydrogen generator 100a the selective oxidation air necessary when progressing the selective oxidation reaction.

For example, the water supplying unit 9 is connected to an infrastructure, such as water service, which can supply water at all times. Then, after the water supplying unit 9 removes foreign matters and the like from the water according to need, it supplies the water through the water supplying port 101 to the preheat evaporator portion 6 of the hydrogen generator 100a while appropriately controlling the amount of the water supplied from the water service or the like.

The raw material supplying unit 10 is connected to a city gas infrastructure in the present embodiment. Then, after the raw material supplying unit 10 removes according to need a component, such as sulfur contained in the city gas, which is harmful for fuel cell system, it supplies the city gas to the preheat evaporator portion 6 of the hydrogen generator 100a through the raw material supplying port 102 and to the heater portion 1, while appropriately controlling the supply amount of the city gas from which sulfur and the like are removed.

The combustion air supplying unit 11 includes, for example, a sirocco fan. After powder dust, foreign matters, and the like are removed by a filter or the like according to need, the combustion air supplying unit 11 supplies an appropriate amount of the air to the heater portion 1 of the hydrogen generator 100a.

The selective oxidation air supplying unit 12 includes, for example, a diaphragm pump. After powder dust, foreign matters, and the like are removed by a filter or the like according to need as with the combustion air supplying unit 11, the selective oxidation air supplying unit 12 supplies an appropriate amount of the air through the air supplying port 103 to the selective oxidizer portion 4 of the hydrogen generator 100a.

As shown in FIG. 1, the fuel cell system according to the present embodiment includes passage switching valves 13a and 13b. Here, the passage switching valve 13a is formed by, for example, a three-way valve, and switches a passage through which the hydrogen-containing gas generated in the hydrogen generator 100a flows. In the present embodiment, the passage switching valve 13a switches between the fuel cell and the heater portion 1, each of which is a destination to which the hydrogen-containing gas generated in the hydrogen generator 100a is supplied. Moreover, the passage switching valve 13b is formed by, for example a three-way valve as with the passage switching valve 13a, and switches between the raw material supplying unit 10 which supplies the material gas and the hydrogen generator 100a which supplies the hydrogen-containing gas, each of which is a supply source of combustion gas supplied to the heater portion 1 of the hydrogen generator 100a.

As shown in FIG. 1, the fuel cell system according to the present embodiment includes a control unit 14. The control unit 14 is formed by a processing unit, such as a microcomputer, and includes, for example, a calculating portion (not shown in FIG. 1) formed by a CPU and the like, and a storage portion (not shown in FIG. 1) formed by an internal memory and the like. Then, in the electric power generating operation of the fuel cell system, the control unit 14 suitably controls the operations of respective components, such as the water supplying unit 9, the raw material supplying unit 10, the combustion air supplying unit 11, the selective oxidation air supplying unit 12, and the passage switching valves 13a and 13b, which constitute the fuel cell system, based on output signals of the temperature detector portion 2b, 3b, 3c, and 4b shown in FIG. 1 and a sequence stored in the storage portion.

Next, a principle of the present invention, which is a basis of a characteristic operation of the hydrogen generator according to the present embodiment described below, will be schematically explained.

Figure 3:
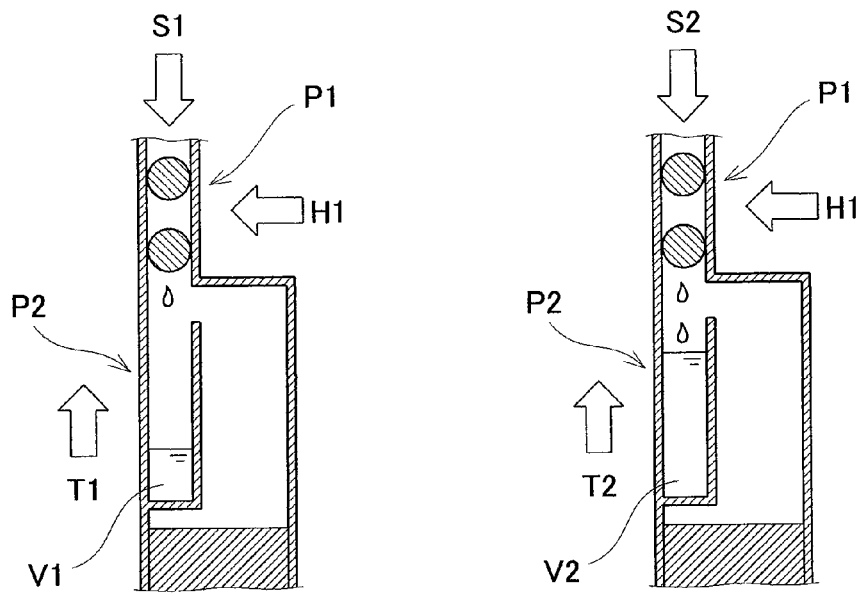
FIG. 3 is a schematic diagram for explaining a principle of the present invention.
Figure 3:
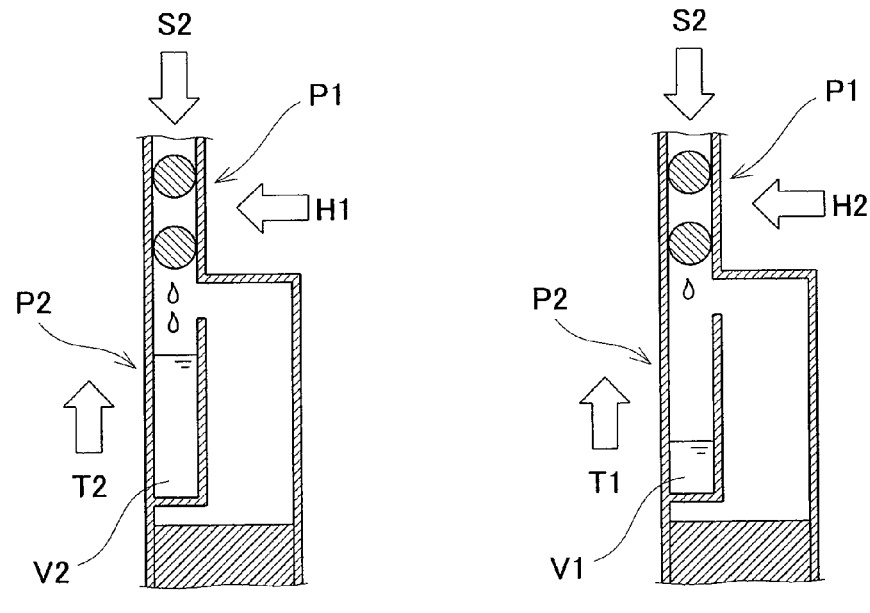

FIG. 3 is a schematic diagram for explaining the principle of the present invention. In the following explanation, for convenience sake, a supply amount S1 is smaller than a supply amount S2, and a heat amount H1 is smaller than a heat amount H2. Moreover, in the following explanation, the principle of the present invention will be schematically explained based on a virtual model.

As shown in FIG. 3(a), in a case where the supply amount S1 of the water is supplied to an evaporator portion P1 corresponding to the preheat evaporator portion 6 shown in FIG. 1, and the heat amount H1 of the heat energy is supplied to the evaporator portion P1, the liquid water which did not evaporate by an evaporator rod, corresponding to the evaporator rod 6a shown in FIG. 1, of the evaporator portion P1 and is discharged from the evaporator rod is trapped in a water trapping portion of a heat exchanger portion P2 corresponding to the heat exchanger portion 8 shown in FIG. 1. Then, the hydrogen-containing gas passing through the vicinity of the heat exchanger portion P2 is adjusted to a temperature T1 by a heat exchange effect of the heat exchanger portion P2 in accordance with the amount of the water trapped in the water trapping portion.

As shown in FIG. 3(b), in a case where the supply amount S2 of the water which is larger than the supply amount S1 is supplied to the evaporator portion P1, and the heat amount H1 of the heat energy is supplied to the evaporator portion P1 as with the case of FIG. 3(a), a comparatively large amount of the liquid water which did not evaporate by the evaporator rod of the evaporator portion P1 is discharged from the evaporator rod, and the volume V2 of the water which is larger than the volume V1 is stored in the water trapping portion of the heat exchanger portion P2. In this case, since the heat exchanger portion P2 is further cooled down by the volume V2 of the water stored therein, the hydrogen-containing gas passing through the vicinity of the heat exchanger portion P2 is adjusted to a temperature T2 which is lower than the temperature T1. To be specific, in the case of not changing the heat amount of the heat energy supplied to the evaporator portion P1, the temperature of the hydrogen-containing gas which contacts the heat exchanger portion P2 can be controlled as desired by controlling the amount of the water supplied to the evaporator portion P1.

As shown in FIG. 3(c), in a case where the supply amount S2 of the water is supplied to the evaporator portion P1, and the heat amount H1 of the heat energy is supplied to the evaporator portion P1, the liquid water which did not evaporate by the evaporator rod of the evaporator portion P1 is discharged from the evaporator rod to the water trapping portion of the heat exchanger portion P2, and the volume V2 of the water is stored in the water trapping portion of the heat exchanger portion P2. In this case, the hydrogen-containing gas passing through the vicinity of the heat exchanger portion P2 is adjusted to the temperature T2 by the heat exchange effect of the heat exchanger portion P2.

As shown in FIG. 3(d), in a case where the supply amount S2 of the water is supplied to the evaporator portion P1, and the heat amount H2 of the heat energy which is larger than the heat amount H1 is supplied to the evaporator portion P1, the amount of the liquid water which did not evaporate by the evaporator rod of the evaporator portion P1 and is discharged from the evaporator rod decreases, and the volume V1 of the water which is smaller than the volume V2 is stored in the water trapping portion of the heat exchanger portion P2. In this case, since the heat exchanger portion P2 is weakly cooled down by the volume V1 of the water, the hydrogen-containing gas passing through the vicinity of the heat exchanger portion P2 is adjusted to the temperature T1 which is higher than the temperature T2. To be specific, in the case of not changing the amount of the water supplied to the evaporator portion P1, the temperature of the hydrogen-containing gas can be arbitrarily controlled by controlling the heat amount of the heat energy supplied to the evaporator portion P1.

In the present invention, based on the above principle, at least one of the amount of heat supplied to the preheat evaporator portion 6 shown in FIG. 1 and the amount of water supplied from the water supplying unit 9 shown in FIG. 1 to the preheat evaporator portion 6 is appropriately controlled to appropriately control the amount of water stored in the water trapping portion 7 of the heat exchanger portion 8 of the hydrogen generator 100a, thereby appropriately controlling the temperature of the hydrogen-containing gas introduced into the shift converter portion 3.

Next, a basic operation of the hydrogen generator according to Embodiment 1 of the present invention will be explained in reference to FIG. 1.

First, when starting up the fuel cell system according to the present invention, the water supplying unit 9 and the raw material supplying unit 10 operate to supply the water and the material gas to the preheat evaporator portion 6 of the hydrogen generator 100a. In the present embodiment, used as the material gas is the city gas which contains desulfurized methane as a major component. Moreover, the supply amount of the water is set such that the water contains oxygen molecules, the amount of which is three times as large as the amount of carbon atoms of an average composition of the material gas. In the present embodiment, since the city gas containing methane as the major component is used as the material gas, a certain amount of the water is supplied to the preheat evaporator portion 6 such that three moles of the steam exist with respect to one mole of the methane. To be specific, the water is supplied from the water supplying unit 9 to the preheat evaporator portion 6 such that the steam to carbon ratio (S/C ratio) is 3.

In the present embodiment, the material gas and the water are supplied through an upper portion of the preheat evaporator portion 6. With this, the material gas and the water are heated in the preheat evaporator portion 6 by the high-temperature combustion gas discharged from the heater portion 1 and the heat transferred from the selective oxidizer portion 4 and the shift converter portion 3. Finally, the mixture gas of the material gas and the steam is generated by the heat, which is transferred via the heat exchanger portion 8, in the preheat evaporator portion 6 located in front of the reformer portion 2, and the mixture gas is supplied to the reformer portion 2.

In the present embodiment, the mixture gas of the steam and the material gas flows from the preheat evaporator portion 6 to the reformer portion 2 in a direction from an upper side to a lower side in FIG. 1. The water supplied from the water supplying unit 9 increases in volume due to the evaporation, which causes a substantial pressure variation in the preheat evaporator portion 6. Here, in a case where the pressure variation is large, the supply amount of the material gas, which is supplied to the preheat evaporator portion 6 simultaneously with the water, varies due to the pressure variation. However, in the present embodiment, by supplying the water from the water supplying unit 9 through the upper portion of the preheat evaporator portion 6, the supplied water can flow to a downstream side inside the preheat evaporator portion 6 in accordance with the gravitational force even when the water increases in volume due to the evaporation. Therefore, it is possible to prevent the pressure variation in the preheat evaporator portion 6.

In the present embodiment, the water trapping portion 7 of the heat exchanger 8 is placed under the preheat evaporator 6 in the direction of gravitational force. Therefore, the liquid water discharged from the preheat evaporator portion 6 flows downward in the direction of gravitational force, and then is trapped by the water trapping portion 7. On this account, the liquid water is not directly supplied to the reforming catalyst 2a filled in the reformer portion 2. With this configuration, it is possible to surely prevent the inhibition of the reforming reaction and the destruction of the reforming catalyst 2a which occur when the reforming catalyst 2a is locally and rapidly cooled down.

In the present embodiment, the operation of the heater portion 1 is controlled based on the temperature detected by the temperature detector portion 2b. The high-temperature combustion gas discharged from the heater portion 1 heats the reforming catalyst 2a of the reformer portion 2, and then heats the preheat evaporator portion 6 while flowing through the combustion gas passage 5. In the present embodiment, the temperature of the combustion gas discharged from the heater portion 1 is controlled such that the temperature of the hydrogen-containing gas discharged from the reforming catalyst 2a which is detected by the temperature detector portion 2b located immediately below (under) the reformer portion 2 becomes about 650° C. As a result, at an exit of the reformer portion 2, about 85% of the city gas is converted into the hydrogen-containing gas through the steam-reforming reaction.

Then, the flow direction of the hydrogen-containing gas discharged from the reformer portion 2 is inverted under the reformer portion 2, and the hydrogen-containing gas flows upward along the heat exchanger portion 8. At this time, the hydrogen-containing gas exchanges heat with the preheat evaporator portion 6 side in the heat exchanger portion 8, and then is supplied to the shift catalyst 3a of the shift converter portion 3. In the shift converter portion 3, the concentration of the carbon monoxide contained in the hydrogen-containing gas is reduced to a predetermined concentration by the water gas shift reaction using the steam. In the present embodiment, the shift converter portion 3 is operated such that the temperature detected by the temperature detector portion 3b of the shift converter portion 3 becomes about 250° C. With this, the concentration of the carbon monoxide contained in the hydrogen-containing gas becomes about 0.5% (dry gas base) at an exit of the shift converter portion 3. In a normal operation, the temperature of the reaction can be maintained at about 250° C. by potential heat of the hydrogen-containing gas discharged from the reformer portion 2. Therefore, it is unnecessary to heat the shift catalyst 3a of the shift converter portion 3 by, for example, a heater.

After that, the air is supplied from the selective oxidation air supplying unit 12 to the hydrogen-containing gas discharged from the shift converter portion 3. Here, the supply amount of the air supplied from the selective oxidation air supplying unit 12 to the hydrogen-containing gas is set such that the number of moles of oxygen contained in the hydrogen-containing gas is about twice as large as the number of moles of carbon monoxide contained in the hydrogen-containing gas. The amount of the air supplied from the selective oxidation air supplying unit 12 is controlled by presetting the supply amount of the air based on the amount of hydrogen to be generated. Moreover, in the present embodiment, the selective oxidizer portion 4 is operated such that the temperature detected by the temperature detector portion 4b of the selective oxidizer portion 4 becomes 125° C. by controlling the supply amount of the air supplied from the selective oxidation air supplying unit 12. The present embodiment may be configured such that an air-cooling fan as a selective oxidation cooler is disposed in a space between the shift converter portion 3 and the selective oxidizer portion 4 or on an outer wall surface of the selective oxidizer portion 4, and the operating temperature of the selective oxidizer portion 4 is accurately controlled by the air-cooling fan. The present embodiment is configured such that the mixture gas of the material gas and the steam can be smoothly supplied from the preheat evaporator portion 6 to the reformer portion 2 by disposing the reformer portion 2 below the preheat evaporator portion 6 (under the preheat evaporator portion 6 in the direction of gravitational force). Even if the water cannot be evaporated in the preheat evaporator portion 6, the water can be evaporated in the reformer portion 2 turned to a high temperature state. As a result, it is possible to prevent the shortage of the steam necessary to suitably progress the steam-reforming reaction in the reformer portion 2.

As above, in the normal operation, the hydrogen generator 100a according to the embodiment of the present invention operates in the same manner as a conventionally general hydrogen generator. By a series of the above operations, the hydrogen generator 100a generates the hydrogen-containing gas such that the concentration of the carbon monoxide becomes about 20 ppm or less.

Next, the characteristic operation of the hydrogen generator according to Embodiment 1 of the present invention will be explained in reference to FIGS. 1 and 4.

Figure 4:
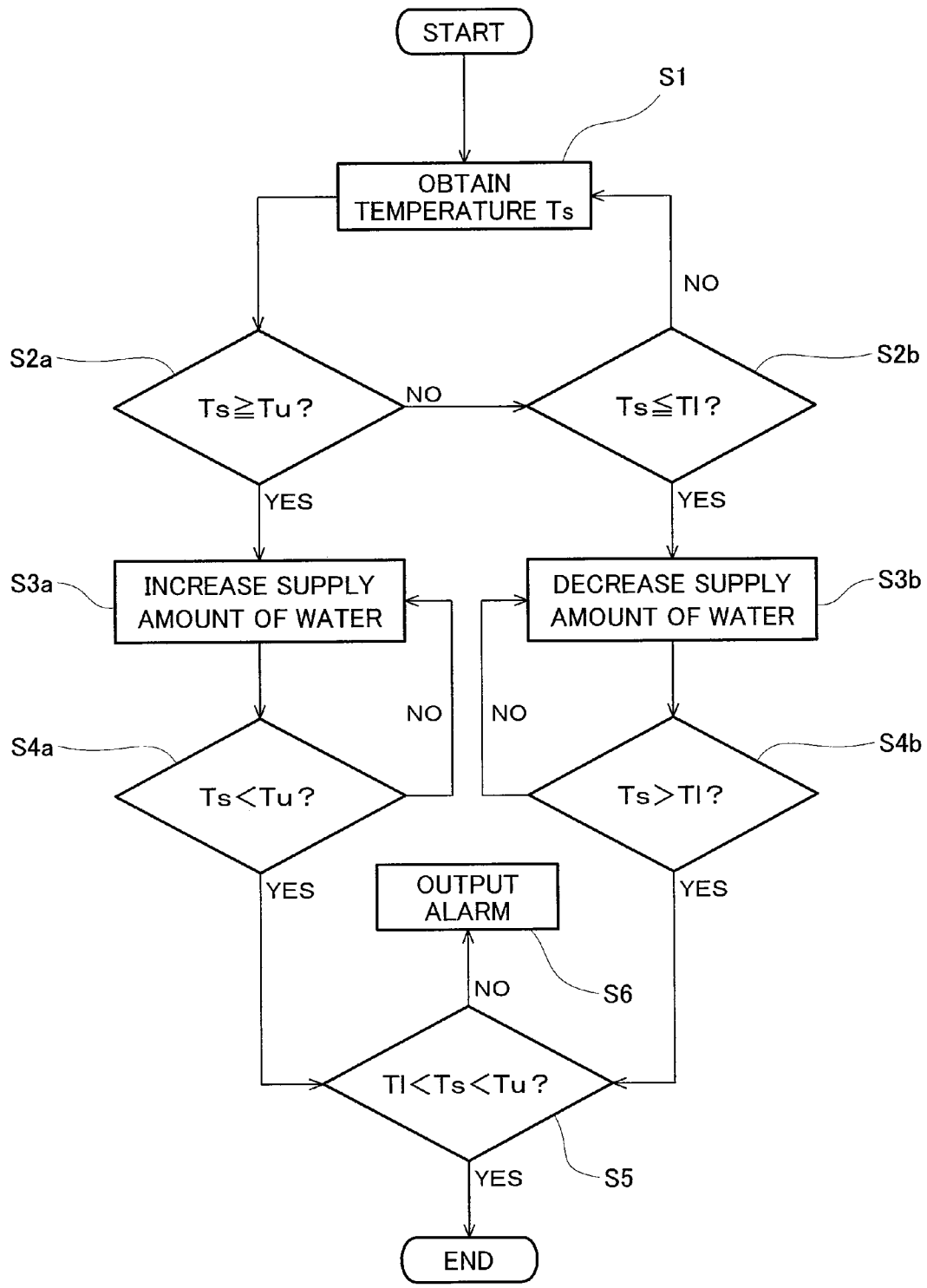
FIG. 4 is a flow chart schematically showing one cycle of a characteristic operation of the hydrogen generator according to Embodiment 1 of the present invention.

FIG. 4 is a flow chart schematically showing one cycle of the characteristic operation of the hydrogen generator according to Embodiment 1 of the present invention. Practically, for example, the operations of one cycle shown in FIG. 4 are not intermittently but continuously executed in the electric power generating operation of the fuel cell system.

As shown in FIG. 4, when the generation of the hydrogen-containing gas is started in the hydrogen generator 100a, the control unit 14 included in the fuel cell system obtains a temperature Ts of the shift catalyst 3a based on the output signal of at least one of the temperature detector portions 3b and 3c (Step S1).

Then, the control unit 14 determines whether or not the temperature Ts of the shift catalyst 3a is not less than an upper limit temperature Tu which is preset in the storage portion of the control unit 14 (Step S2a). When the control unit 14 determines that the temperature Ts of the shift catalyst 3a is less than the upper limit temperature Tu which is preset in the storage portion of the control unit 14 (NO in Step S2a), it determines whether or not the temperature Ts of the shift catalyst 3a is not more than a lower limit temperature Tl which is preset in the storage portion of the control unit 14 (Step S2b). When the control unit 14 determines that the temperature Ts of the shift catalyst 3a is more than the lower limit temperature Tl which is preset in the storage portion of the control unit 14 (NO in Step S2b), it again obtains the temperature Ts of the shift catalyst 3a.

On the other hand, when the control unit 14 determines that the temperature Ts of the shift catalyst 3a is not less than the upper limit temperature Tu which is preset in the storage portion of the control unit 14 (YES in Step S2a), it increases the supply amount of the water supplied from the water supplying unit 9 to the preheat evaporator portion 6 (Step S3a). Or, when the control unit 14 determines that the temperature Ts of the shift catalyst 3a is not more than the lower limit temperature Tl which is preset in the storage portion of the control unit 14 (YES in Step S2b), it decreases the supply amount of the water supplied from the water supplying unit 9 to the preheat evaporator portion 6 (Step S3b). In the present embodiment, the increase in the supply amount of the water supplied from the water supplying unit 9 to the preheat evaporator portion 6 is executed in accordance with preset amount increase data. Similarly, the decrease in the supply amount of the water supplied from the water supplying unit 9 to the preheat evaporator portion 6 is executed in accordance with preset amount decrease data.

As above, the characteristic operation of the hydrogen generator 100a according to the present embodiment is different from the operation of the conventional hydrogen generator in that the upper limit temperature Tu and the lower limit temperature Tl of the temperature detected by at least one of the temperature detector portions 3b and 3c are preset, and when the temperature detected by at least one of the temperature detector portions 3b and 3c is not less than the upper limit temperature Tu, the amount of the water supplied from the water supplying unit 9 to the preheat evaporator portion 6 is increased to increase the amount of necessary evaporative latent heat in the preheat evaporator portion 6. In addition, the characteristic operation of the hydrogen generator 100a according to the present embodiment is different from the operation of the conventional hydrogen generator in that when the temperature detected by at least one of the temperature detector portions 3b and 3c is not more than the lower limit temperature Tl, the amount of the water supplied from the water supplying unit 9 to the preheat evaporator portion 6 is decreased to decrease the amount of the necessary evaporative latent heat in the preheat evaporator portion 6.

After the supply amount of the water supplied from the water supplying unit 9 to the preheat evaporator portion 6 is increased in Step S3a, the control unit 14 determines whether or not the temperature Ts of the shift catalyst 3a is less than the upper limit temperature Tu (Step S4a). Or, after the supply amount of the water supplied from the water supplying unit 9 to the preheat evaporator portion 6 is decreased in Step S3b, the control unit 14 determines whether or not the temperature Ts of the shift catalyst 3a is more than the lower limit temperature Tl (Step S4b).

When the control unit 14 determines that the temperature Ts of the shift catalyst 3a is not less than the upper limit temperature Tu (NO in Step S4a), the supply amount of the water supplied from the water supplying unit 9 to the preheat evaporator portion 6 is further increased. Or, when the control unit 14 determines that the temperature Ts of the shift catalyst 3a is not more than the lower limit temperature Tl (NO in Step S4b), the supply amount of the water supplied from the water supplying unit 9 to the preheat evaporator portion 6 is further decreased.

In contrast, when the control unit 14 determines that the temperature Ts of the shift catalyst 3a is less than the upper limit temperature Tu (YES in Step S4a), it determines whether or not the temperature Ts of the shift catalyst 3a is more than the lower limit temperature Tl (Step S5), while maintaining the supply amount of the water supplied from the water supplying unit 9 to the preheat evaporator portion 6. Or, when the control unit 14 determines that the temperature Ts of the shift catalyst 3a exceeds the lower limit temperature Tl (YES in Step S4b), it determines whether or not the temperature Ts of the shift catalyst 3a is less than the upper limit temperature Tu (Step S5), while maintaining the supply amount of the water supplied from the water supplying unit 9 to the preheat evaporator portion 6. In a case where the temperature Ts of the shift catalyst 3a is excessively decreased to the lower limit temperature Tl or lower or in a case where the temperature Ts of the shift catalyst 3a is excessively increased to the upper limit temperature Tu or higher (NO in Step S5), the control unit 14 outputs an alarm to, for example, an operator or a user (Step S6). However, in a case where the temperature Ts of the shift catalyst 3a is a temperature between the upper limit temperature Tu and the lower limit temperature Tl (YES in Step S5), the control unit 14 terminates the temperature control of the shift catalyst 3a.

As above, the characteristic operation of the hydrogen generator 100a according to the present embodiment is different from the operation of the conventional hydrogen generator in that the temperature of the shift catalyst 3a of the shift converter portion 3 is controlled to an optimal temperature by the operations of Steps S1 to S5 shown in FIG. 4.

Here, the reason why the temperature Ts of the shift catalyst 3a of the shift converter portion 3 can be decreased is as follows: the amount of the water stored in the water trapping portion 7 of the heat exchanger portion 8 is increased by increasing the amount of the water supplied from the water supplying unit 9 to the preheat evaporator portion 6; therefore, the amount of the heat transferred to the preheat evaporator portion 6 side from the hydrogen-containing gas discharged from the reformer portion 2 is increased; and on this account, the hydrogen-containing gas supplied to the shift converter portion 3 is decreased in temperature. In contrast, the reason why the temperature Ts of the shift catalyst 3a of the shift converter portion 3 can be increased is as follows: the amount of the water stored in the water trapping portion 7 of the heat exchanger portion 8 is decreased by decreasing the amount of the water supplied from the water supplying unit 9 to the preheat evaporator portion 6; with this, the amount of the heat transferred to the preheat evaporator portion 6 side from the hydrogen-containing gas discharged from the reformer portion 2 is decreased; and therefore, the hydrogen-containing gas supplied to the shift converter portion 3 is increased in temperature.

In the hydrogen generator 100a configured by integrating carbon monoxide removing portions, such as the reformer portion 2, the shift converter portion 3, and the selective oxidizer portion 4 since heat transfer among reaction portions is stable at respective operating temperatures of the reaction portions, a change in temperature of one reaction portion may change this balance, so that optimal operating temperatures may not be maintained. That is, in many cases, the change in temperature of the carbon monoxide removing portion occurs by an event that a supply balance between the water and the material gas is lost. Especially, when the supply amount of the water changes, for example, when the supply amount of the water is smaller than an assumed supply amount due to any cause, the shift catalyst 3a of the shift converter portion 3 increases in temperature as described above. Therefore, in accordance with the configuration of the present embodiment, the supply amount of the water supplied from the water supplying unit 9 to the preheat evaporator portion 6 is controlled to be increased. On this account, it is possible to achieve an effect of finally stabilizing the temperature detected by the temperature detector portion 3b (or the temperature detector portion 3c) within an appropriate range, that is, being capable of supplying the water within an appropriate supply amount range. In the present embodiment, since the heat exchanger portion 8 is disposed at the passage of the hydrogen-containing gas supplied to the shift converter portion 3, the temperature of the shift catalyst 3a of the shift converter portion 3 can be easily controlled by controlling the supply amount of the water supplied for the steam-reforming reaction.

Moreover, in the present embodiment, the upper limit temperature Tu and the lower limit temperature Tl which are preset in the storage portion of the control unit 14 need to be determined in consideration of a catalyst characteristic of the shift catalyst 3a.

Figure 6:
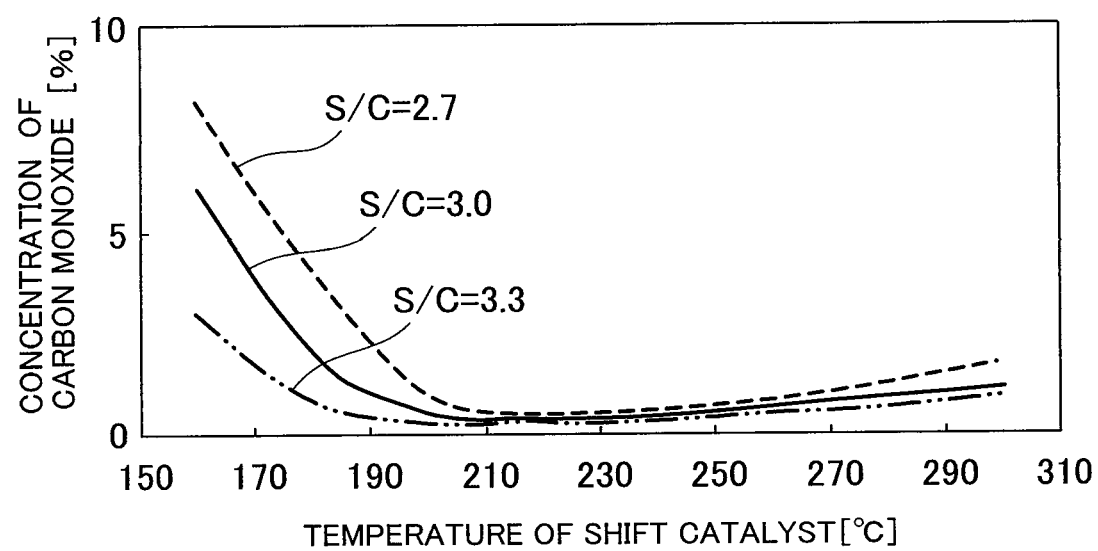
FIG. 6 is a graph schematically showing a result of one evaluation example regarding a temperature activity of a Cu—Zn based shift catalyst.

FIG. 6 is a graph schematically showing a result of one evaluation example regarding the temperature activity of a Cu—Zn based shift catalyst according to Embodiment 1 of the present invention. Moreover, FIG. 6 shows a result of one evaluation example of the Cu—Zn based shift catalyst in a fixed-bed flow device. Further, FIG. 6 shows a result of an evaluation carried out under such conditions that a pseudo mixture gas prepared by adding the steam to a hydrogen balance gas (dry gas basis) whose carbon monoxide content rate is 10% and whose carbon dioxide content rate is 10% is used, the S/C ratio which assumes the steam-reforming reaction is 2.7, 3.0, or 3.3, and a space velocity (SV) is 1,000 per hour.

As shown in FIG. 6, in order to effectively reduce the concentration of the carbon monoxide contained in the hydrogen-containing gas discharged from the reformer portion 2, it is desirable that the temperature of the shift catalyst 3a of the shift converter portion 3 be controlled to about 220° C. regardless of the S/C ratio.

Meanwhile, it is clear from FIG. 6 that an efficiency of reducing the carbon monoxide deteriorates especially in a low-temperature region as the S/C ratio decreases. In the actual hydrogen generator, the shift catalyst 3a of the shift converter portion 3 increases in temperature as the supply amount of the water supplied from the water supplying unit 9 to the preheat evaporator portion 6 decreases. Therefore, the concentration of the carbon monoxide contained in the hydrogen-containing gas is less likely to increase significantly. Then, in a case where the supply amount of the water supplied from the water supplying unit 9 to the preheat evaporator portion 6 is increased in this state, the temperature of the shift catalyst 3a of the shift converter portion 3 decreases, however, the S/C ratio increases. On this account, the efficiency of reducing the carbon monoxide is less likely to deteriorate significantly. Therefore, the concentration of the carbon monoxide contained in the hydrogen-containing gas discharged from the shift converter portion 3 can be controlled so as not to increase.

In the present embodiment, for example, the upper limit temperature Tu and the lower limit temperature Tl of the temperature detected by the temperature detector portion 3b are set to 240° C. and 200° C., respectively. Then, by appropriately increasing and decreasing the amount of the water supplied from the water supplying unit 9 to the preheat evaporator portion 6, the concentration of the carbon monoxide contained in the hydrogen-containing gas at the exit of the shift converter portion 3 is controlled so as not to exceed 0.5% (dry gas base). Note that the upper limit temperature Tu and the lower limit temperature Tl of the temperature detected by the temperature detector portion 3b change depending on the configuration of the hydrogen generator 100a, such as the size of the shift catalyst 3a, the type of the catalyst applied, the amount of the catalyst filled, and the operating conditions. Therefore, the upper limit temperature Tu and the lower limit temperature Tl need to be set after the correlation between the supply amount of the water and the temperature detected by the temperature detector portion 3b is measured for each hydrogen generator 100a. Moreover, in the present embodiment, the temperature of the shift catalyst 3a of the shift converter portion 3 is detected by, for example, the temperature detector portion 3b disposed in the vicinity of the shift catalyst 3a. However, the present embodiment is not limited to this. The temperature detector portion may be disposed anywhere as long as it can directly or indirectly detect the temperature of the shift catalyst 3a of the shift converter portion 3.

Moreover, in the present embodiment, for example, a water flow meter is disposed between the water supplying unit 9 and the preheat evaporator portion 6, and an upper limit supply amount and a lower limit supply amount of the supply amount of the water supplied to the preheat evaporator portion 6 are set. With this, it is possible to detect the deterioration of the performance of, for example, the temperature detector portions 3b and 3c in the fuel cell system. That is, it is possible to carry out self-diagnosis of the fuel cell system.

For example, the water flow meter is incorporated in the water supplying unit 9, and the upper limit supply amount and the lower limit supply amount of the supply amount of the water supplied from the water supplying unit 9 to the preheat evaporator portion 6 are preset. Then, for example, in a case where the supply amount of the water supplied from the water supplying unit 9 to the preheat evaporator portion 6 reaches the upper limit supply amount or more when it is increased since the temperature detected by the temperature detector portion 3b is not less than the upper limit temperature Tu, it is determined that the performance of, for example, the temperature detector portions 3b and 3c has been deteriorated. Or, in a case where the supply amount of the water supplied from the water supplying unit 9 to the preheat evaporator portion 6 reaches the lower limit supply amount or less when it is decreased since the temperature detected by the temperature detector portion 3b is not more than the lower limit temperature Tl, it is determined that the performance of, for example, the temperature detector portions 3b and 3c has been deteriorated.

Moreover, as another example, in the hydrogen generator 100a configured by integrating the reformer portion 2, the shift converter portion 3, and the selective oxidizer portion 4 which are exemplified in the present embodiment, in a case where the supply amount of the material gas and the supply amount of the water are stable, the heat transfer among the reaction portions is stable at respective operating temperatures of the reaction portions, so that the temperatures of the reaction portions hover comparatively stably. Therefore, by controlling the supply amount of the water supplied from the water supplying unit 9, the temperature of the shift catalyst 3a of the shift converter portion 3 can be stabilized within an assumed range.

However, for example, in a case where the temperature detected by the temperature detector portion 3b is not controlled within the assumed range even though the supply amount of the water is controlled within the assumed range, the heat transfer among the reaction portions is unstable. In this case, this instability of the heat transfer may be caused because the supply amount of the water supplied from the water supplying unit 9 to the preheat evaporator portion 6 is outside the assumed range. For example, in a case where the performance of the water supplying unit 9 deteriorates over time, an appropriate amount of the water may not be supplied in response to an input voltage. Moreover, in a case where the performance of the temperature detector portion, such as the temperature detector portion 3b, deteriorates over time, the temperature may not be stable within an initially assumed temperature range. In this case, if the operation of the fuel cell system is continued without exercising a proper treatment, the concentration of the carbon monoxide contained in the hydrogen-containing gas discharged from the shift converter portion 3 increases when the actual supply amount of the water is small. In contrast, when the actual supply amount of the water is large, the heat energy is excessively consumed to evaporate the water. Therefore, the efficiency of generating the hydrogen deteriorates. However, in the configuration in which the above-described flow meter is disposed and the upper limit supply amount and the lower limit supply amount of the supply amount of the water are set, it is possible to detect the performance deterioration of, for example, the water supplying unit 9 and the temperature detector portions 3b and 3c. Therefore, it is possible to preferably and surely execute the characteristic operation of the hydrogen generator 100a exemplified in the present embodiment. Moreover, in accordance with this configuration, it is possible to avoid continuation of an abnormal electric power generating operation of the fuel cell system.

In the hydrogen generator configured by integrating the reformer portion, the shift converter portion, and the selective oxidizer portion, in a case where a temperature control mechanism is provided for each reaction portion to optimize each operating temperature, the amount of heat radiation increases due to the increase in size of the hydrogen generator, and the efficiency of generating the hydrogen deteriorates. However, in the present embodiment, by changing the supply amount of the water supplied to the preheat evaporator portion, the temperature of the shift catalyst 3a of the shift converter portion 3 can be appropriately controlled without deteriorating the efficiency of generating the hydrogen.

Embodiment 2

A hardware configuration of the hydrogen generator according to Embodiment 2 of the present invention, an additional hardware configuration for driving the hydrogen generator, and the basic operation of the hydrogen generator are the same as those of Embodiment 1. Therefore, explanations thereof are omitted in Embodiment 2 of the present invention.

The difference between the characteristic operation of the hydrogen generator of the present embodiment and the characteristic operation of the hydrogen generator of Embodiment 1 is that, for example, the upper limit temperature Tu and the lower limit temperature Tl of the temperature detected by the temperature detector portion 3*b* are preset, and in a case where the temperature detected by the temperature detector portion 3*b* is not less than the upper limit temperature Tu, the supply amount of the combustion air supplied to the heater portion 1 is decreased. Another difference therebetween is that, for example, in a case where the temperature detected by the temperature detector portion 3*b* is not more than the lower limit temperature Tl, the supply amount of the combustion air supplied to the heater portion 1 is increased. By this characteristic operation, the temperature of the shift catalyst 3*a* of the shift converter portion 3 can be controlled to the optimal temperature.

Hereinafter, the characteristic operation of the hydrogen generator according to Embodiment 2 of the present invention will be explained in reference to FIGS. 1 and 5.

Figure 5:
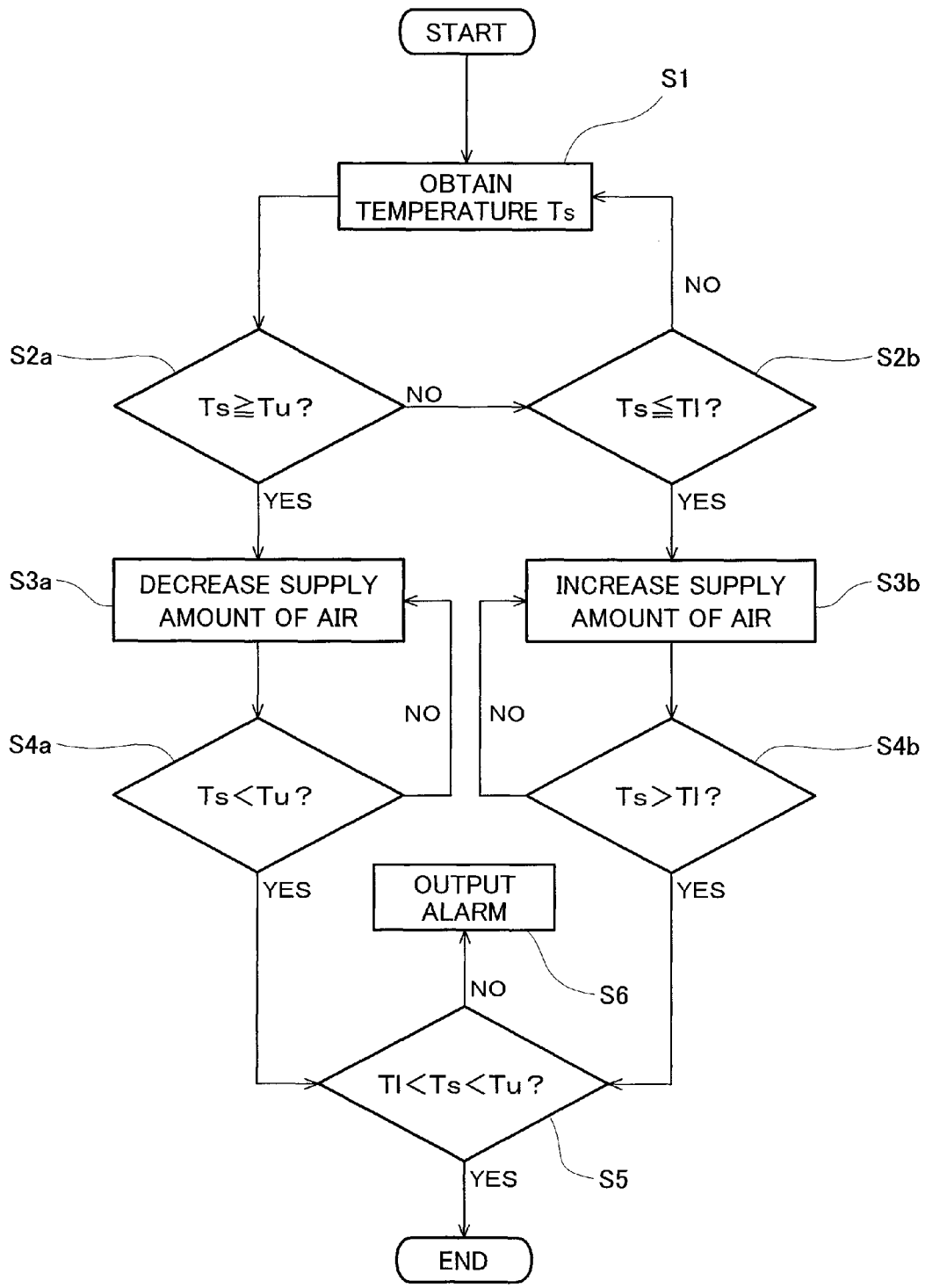
FIG. 5 is a flow chart schematically showing one cycle of a characteristic operation of the hydrogen generator according to Embodiment 2 of the present invention.

FIG. 5 is a flow chart schematically showing one cycle of the characteristic operation of the hydrogen generator according to Embodiment 2 of the present invention.

As shown in FIG. 5, when the generation of the hydrogen-containing gas is started in the hydrogen generator 100*a*, the control unit 14 included in the fuel cell system obtains the temperature Ts of the shift catalyst 3*a* based on the output signal of at least one of the temperature detector portions 3*b* and 3*c* (Step S1).

Then, the control unit 14 determines whether or not the temperature Ts of the shift catalyst 3*a* is not less than the upper limit temperature Tu which is preset in the storage portion of the control unit 14 (Step S2*a*). When the control unit 14 determines that the temperature Ts of the shift catalyst 3*a* is less than the upper limit temperature Tu which is preset in the storage portion of the control unit 14 (NO in Step S2*a*), it determines whether or not the temperature Ts of the shift catalyst 3*a* is not more than the lower limit temperature Tl which is preset in the storage portion of the control unit 14 (Step S2*b*). When the control unit 14 determines that the temperature Ts of the shift catalyst 3*a* is more than the lower limit temperature Tl which is preset in the storage portion of the control unit 14 (NO in Step S2*b*), it again obtains the temperature Ts of the shift catalyst 3*a*.

In contrast, when the control unit 14 determines that the temperature Ts of the shift catalyst 3*a* is not less than the upper limit temperature Tu which is preset in the storage portion of the control unit 14 (YES in Step S2*a*), it decreases the supply amount of the air supplied from the combustion air supplying unit 11 to the heater portion 1 (Step S3*a*). Moreover, when the control unit 14 determines that the temperature Ts of the shift catalyst 3*a* is not more than the lower limit temperature Tl which is preset in the storage portion of the control unit 14 (YES in Step S2*b*), it increases the supply amount of the air supplied from the combustion air supplying unit 11 to the heater portion 1 (Step S3*b*). In the present embodiment, the decrease in the supply amount of the air supplied from the combustion air supplying unit 11 to the heater portion 1 is executed in accordance with preset amount decrease data. Similarly, the increase in the supply amount of the air supplied from the combustion air supplying unit 11 to the heater portion 1 is executed in accordance with preset amount increase data.

As above, the characteristic operation of the hydrogen generator 100*a* according to the present embodiment is different from the operation of the conventional hydrogen generator in that the upper limit temperature Tu and the lower limit temperature Tl of the temperature detected by at least one of the temperature detector portions 3*b* and 3*c* are preset, and when the temperature detected by at least one of the temperature detector portions 3*b* and 3*c* is not less than the upper limit temperature Tu, the supply amount of the air supplied from the combustion air supplying unit 11 to the heater portion 1 is decreased to decrease the amount of the heat supplied to the preheat evaporator portion 6. In addition, the characteristic operation of the hydrogen generator 100*a* according to the present embodiment is different from the operation of the conventional hydrogen generator in that when the temperature detected by at least one of the temperature detector portions 3*b* and 3*c* is not more than the lower limit temperature Tl, the supply amount of the air supplied from the combustion air supplying unit 11 to the heater portion 1 is increased to increase the amount of the heat supplied to the preheat evaporator portion 6.

After the supply amount of the air supplied from the combustion air supplying unit 11 to the heater portion 1 is decreased in Step S3*a*, the control unit 14 determines whether or not the temperature Ts of the shift catalyst 3*a* is less than the upper limit temperature Tu (Step S4*a*). Or, after the supply amount of the air supplied from the combustion air supplying unit 11 to the heater portion 1 is increased in Step S3*b*, the control unit 14 determines whether or not the temperature Ts of the shift catalyst 3*a* exceeds the lower limit temperature Tl (Step S4*b*).

When the control unit 14 determines that the temperature Ts of the shift catalyst 3*a* is still not less than the upper limit temperature Tu (NO in Step S4*a*), the supply amount of the air supplied from the combustion air supplying unit 11 to the heater portion 1 is further decreased. Or, when the control unit 14 determines that the temperature Ts of the shift catalyst 3*a* is still not more than the lower limit temperature Ti (NO in Step S4*b*), the supply amount of the air supplied from the combustion air supplying unit 11 to the heater portion 1 is further increased.

On the other hand, when the control unit 14 determines that the temperature Ts of the shift catalyst 3*a* is less than the upper limit temperature Tu (YES in Step S4*a*), it determines whether or not the temperature Ts of the shift catalyst 3*a* is more than the lower limit temperature Tl (Step S5), while maintaining the supply amount of the air supplied from the combustion air supplying unit 11 to the heater portion 1. Or, when the control unit 14 determines that the temperature Ts of the shift catalyst 3*a* exceeds the lower limit temperature Tl (YES in Step S4*b*), it determines whether or not the temperature Ts of the shift catalyst 3*a* is less than the upper limit temperature Tu (Step S5), while maintaining the supply amount of the air supplied from the combustion air supplying unit 11 to the heater portion 1. In a case where the temperature Ts of the shift catalyst 3*a* is excessively decreased to the lower limit temperature Tl or lower or in a case where the temperature Ts of the shift catalyst 3*a* is excessively increased to the upper limit temperature Tu or higher (NO in Step S5), the control unit 14 outputs an alarm to an operator or a user (Step S6). However, in a case where the temperature Ts of the shift catalyst 3*a* is a temperature between the upper limit temperature Tu and the lower limit temperature Tl (YES in Step S5), the control unit 14 terminates the temperature control of the shift catalyst 3*a*.

As above, the characteristic operation of the hydrogen generator 100*a* according to the present embodiment is different from the operation of the conventional hydrogen generator in that the temperature of the shift catalyst 3a of the shift converter portion 3 is controlled to the optimal temperature by the operations of Steps S1 to S5 shown in FIG. 5.

Here, the temperature Ts of the shift catalyst 3a of the shift converter portion 3 can be decreased as follows.

To be specific, the amount of the combustion gas supplied to the combustion gas passage 5 is decreased by decreasing the amount of the air supplied from the combustion air supplying unit 11 to the heater portion 1. Therefore, the amount of the heat supplied from the heater portion 1 to the preheat evaporator portion 6 is decreased. At this time, since the amount of the necessary evaporative latent heat necessary in the preheat evaporator portion 6 is constant, the amount of the water stored in the water trapping portion 7 of the heat exchanger portion 8 is increased. With this, since the amount of the heat transferred to the preheat evaporator portion 6 side from the hydrogen-containing gas discharged from the reformer portion 2 is increased, the hydrogen-containing gas supplied to the shift converter portion 3 is decreased in temperature. Therefore, it is possible to decrease the temperature Ts of the shift catalyst 3a of the shift converter portion 3.

Moreover, the reason why the temperature Ts of the shift catalyst 3a of the shift converter portion 3 can be increased is as follows.

To be specific, the amount of the combustion gas supplied to the combustion gas passage 5 is increased by increasing the amount of the air supplied from the combustion air supplying unit 11 to the heater portion 1. Therefore, the amount of the heat supplied from the heater portion 1 to the preheat evaporator portion 6 is increased. At this time, since the amount of the necessary evaporative latent heat necessary in the preheat evaporator portion 6 is constant, the amount of the water stored in the water trapping portion 7 of the heat exchanger portion 8 is decreased. With this, since the amount of heat transferred to the preheat evaporator portion 6 side from the hydrogen-containing gas discharged from the reformer portion 2 is decreased, the hydrogen-containing gas supplied to the shift converter portion 3 is decreased in temperature. Therefore, it is possible to increase the temperature Ts of the shift catalyst 3a of the shift converter portion 3.

In the present embodiment, by creating a database containing a relation between a voltage applied to the sirocco fan or the like and the supply amount of the air, the increase and decrease in the supply amount of the air supplied to the heater portion 1 is controlled by changing the voltage applied to the sirocco fan or the like. Moreover, by creating a database containing a relation between the number of rotations of the sirocco fan or the like and the supply amount of the air, the supply amount of the air supplied to the heater portion 1 can be increased or decreased by controlling the number of rotations of the sirocco fan or the like.

Moreover, for example, the upper limit temperature Tu and the lower limit temperature Tl of the temperature detected by the temperature detector portion 3b change depending on the configuration of the hydrogen generator 100a, such as the size of the shift catalyst 3a, the type of the catalyst applied, the amount of the catalyst filled, and the operating conditions. Therefore, the upper limit temperature Tu and the lower limit temperature Tl need to be set after the correlation between the supply amount of the water and the temperature detected by the temperature detector portion 3b is measured for each hydrogen generator 100a.

Moreover, in the present embodiment, for example, an air flow meter is disposed between the combustion air supplying unit 11 and the heater portion 1, and an upper limit supply amount and a lower limit supply amount of the supply amount of the air supplied to the heater portion 1 are set. With this, it is possible to detect the deterioration of the performance of, for example, the temperature detector portions 3b and 3c in the fuel cell system. That is, it is possible to carry out self-diagnosis of the fuel cell system.

For example, the air flow meter is incorporated in the combustion air supplying unit 11, and the upper limit supply amount and the lower limit supply amount of the supply amount of the air supplied from the combustion air supplying unit 11 to the heater portion 1 are preset. Then, in a case where the supply amount of the air supplied from the combustion air supplying unit 11 to the heater portion 1 reaches the lower limit supply amount or less when it is decreased since the temperature detected by the temperature detector portion 3b is not less than the upper limit temperature Tu, it is determined that the performance of, for example, the temperature detector portions 3b and 3c has been deteriorated. Or, in a case where the supply amount of the air supplied from the combustion air supplying unit 11 to the heater portion 1 reaches the upper limit supply amount or more when it is increased since the temperature detected by the temperature detector portion 3b is not more than the lower limit temperature Tl, it is determined that the performance of, for example, the temperature detector portions 3b and 3c has been deteriorated.

Moreover, as another example, in the hydrogen generator 100a configured by integrating the reformer portion 2, the shift converter portion 3, and the selective oxidizer portion 4 which are exemplified in the present embodiment, in a case where the supply amount of the material gas and the supply amount of the water are stable, the heat transfer among the reaction portions is stable at respective operating temperatures of the reaction portions, so that the temperatures of the reaction portions hover comparatively stably. Therefore, by controlling the supply amount of the air supplied from the combustion air supplying unit 11, the temperature of the shift catalyst 3a of the shift converter portion 3 can be stabilized within an assumed range.

However, for example, in a case where the temperature detected by the temperature detector portion 3b is not controlled within the assumed range even though the supply amount of the air is controlled within the assumed range, the heat transfer among the reaction portions is unstable. Then, this instability of the heat transfer may be caused because the supply amount of the air supplied from the combustion air supplying unit 11 to the heater portion 1 is outside the assumed range.

For example, in a case where the performance of the sirocco fan disposed at the combustion air supplying unit 11 deteriorates over time, an appropriate amount of the air may not be supplied in response to an input voltage. Moreover, in a case where the performance of the temperature detector portion, such as the temperature detector portion 3b, deteriorates over time, the temperature may not be stable within an initially assumed temperature range. Further, the sirocco fan may not be able to adequately deliver its predetermined performance due to the closure of an air intake of the combustion air supplying unit 11, the increase in the pressure loss inside the heater portion 1, or the like.

In this case, if the operation of the fuel cell system is continued without exercising a proper treatment, the concentration of the carbon monoxide contained in the combustion gas discharged from the heater portion 1 increases when the actual supply amount of the air is small. In contrast, when the actual supply amount of the air is large, the combustion in the heater portion 1 becomes unstable, and therefore, the concentration of the carbon monoxide contained in the combustion gas discharged from the heater portion 1 increases. Or, since the heat energy taken out by the combustion gas discharged from the hydrogen generator 100a increases, the efficiency of generating the hydrogen in the hydrogen generator 100a deteriorates.

However, in the configuration in which the above-described flow meter is disposed and the upper limit supply amount and the lower limit supply amount of the supply amount of the air are set, it is possible to detect the performance deterioration of, for example, the combustion air supplying unit 11 and the temperature detector portions 3b and 3c. Therefore, it is possible to preferably and surely execute the characteristic operation of the hydrogen generator 100a exemplified in the present embodiment. Moreover, in accordance with this configuration, it is possible to avoid continuation of an abnormal electric power generating operation of the fuel cell system.

In the hydrogen generator configured by integrating the reformer portion, the shift converter portion, and the selective oxidizer portion, in a case where a temperature control mechanism is provided for each reaction portion to optimize each operating temperature, the amount of heat radiation increases due to the increase in size of the hydrogen generator, and the efficiency of generating the hydrogen deteriorates. However, in the present embodiment, by changing the supply amount of the air supplied to the heater portion, the temperature of the shift catalyst 3a of the shift converter portion 3 can be appropriately controlled without deteriorating the efficiency of generating the hydrogen.

Other than these points, Embodiment 2 is the same as Embodiment 1.

Embodiment 3

A hardware configuration of the hydrogen generator according to Embodiment 3 of the present invention, an additional hardware configuration for driving the hydrogen generator, and the basic operation of the hydrogen generator are the same as those of Embodiments 1 and 2. Therefore, explanations thereof are omitted in Embodiment 3 of the present invention.

The characteristic operation of the hydrogen generator 100a of the present embodiment will be explained as an operation obtained by suitably combining the characteristic operation of the hydrogen generator 100a of Embodiment 1 and the characteristic operation of the hydrogen generator 100a of Embodiment 2.

To be specific, for example, the upper limit temperature Tu and the lower limit temperature Tl of the temperature detected by the temperature detector portion 3b are preset, and the upper limit supply amount and the lower limit supply amount of the supply amount of the water supplied from the water supplying unit 9 to the preheat evaporator portion 6 are also preset. Then, when the temperature detected by the temperature detector portion 3b is not less than the upper limit temperature Tu, and the supply amount of the water supplied from the water supplying unit 9 to the preheat evaporator portion 6 is not less than the upper limit supply amount, the supply amount of the combustion air supplied to the heater portion 1 is decreased. Moreover, for example, when the temperature detected by the temperature detector portion 3b is not more than the lower limit temperature Tl, and the supply amount of the water supplied from the water supplying unit 9 to the preheat evaporator portion 6 is not more than the lower limit supply amount, the supply amount of the combustion air supplied to the heater portion 1 is increased. By this characteristic operation, the temperature of the shift catalyst 3a of the shift converter portion 3 is appropriately controlled to the optimal temperature.

Here, in order to effectively reduce the concentration of the carbon monoxide contained in the hydrogen-containing gas in the shift converter portion 3, it is desirable that the supply amount of the water supplied from the water supplying unit 9 to the preheat evaporator portion 6 be secured to some extent. On the other hand, in order to adequately secure the efficiency of generating the hydrogen in the hydrogen generator 100a, it is necessary to avoid a significant increase in the supply amount of the water supplied from the water supplying unit 9 to the preheat evaporator portion 6.

In accordance with the present embodiment, the temperature of the shift catalyst 3a of the shift converter portion 3 is controlled by two control factors which are a first control factor of whether the supply amount of the water supplied from the water supplying unit 9 to the preheat evaporator portion 6 is increased or decreased and a second control factor of whether the supply amount of the air supplied from the combustion air supplying unit 11 to the heater portion 1 is increased or decreased. Therefore, it is possible to suppress the difference (that is, a variation range of the supply amount of the water) between the upper limit supply amount and the lower limit supply amount of the supply amount of the water. Moreover, since it is possible to suppress the difference between the upper limit supply amount and the lower limit supply amount, it is possible to stabilize the temperature of the reforming catalyst 2a of the reformer portion 2 and the temperature of the selective oxidation catalyst 4a of the selective oxidizer portion 4 in addition to the shift converter portion 3.

In a case where the variation range of the supply amount of the water supplied from the water supplying unit 9 to the preheat evaporator portion 6 is set to be narrow, a control range of the temperature of the shift catalyst 3a of the shift converter portion 3 becomes narrow. However, even when the temperature of the shift catalyst 3a of the shift converter portion 3 is outside the control range, it can be controlled by controlling the supply amount of the air supplied from the combustion air supplying unit 11 to the heater portion 1. As a result, it is possible to suppress the probability of the generation of the carbon monoxide in the shift converter portion 3 and control the operating temperatures of the carbon monoxide removing portions to more appropriate operating temperatures.

Moreover, used in addition to the above-described control operation is a control operation of adjusting the amount of combustion in the heater portion 1 such that the temperature detected by the temperature detector portion 2b becomes a predetermined temperature. With this, even when the supply amount of the combustion air supplied to the heater portion 1 is increased, the operating temperature of the reformer portion 2 stabilizes, so that a reaction of generating the hydrogen also stabilizes. Therefore, it is possible to more appropriately operate the hydrogen generator 100a.

Moreover, for example, the upper limit temperature Tu and the lower limit temperature Tl of the temperature detected by the temperature detector portion 3b change depending on the configuration of the hydrogen generator 100a, such as the size of the shift catalyst 3a, the type of the catalyst applied, the amount of the catalyst filled, and the operating conditions. Therefore, the upper limit temperature Tu and the lower limit temperature Tl need to be set after the correlation among the supply amount of the water supplied to the preheat evaporator portion 6, the supply amount of the air supplied to the heater portion 1, and the temperature detected by the temperature detector portion 3b is measured for each hydrogen generator 100a.

Other than these points, Embodiment 3 is the same as Embodiments 1 and 2.

Embodiment 4

A hardware configuration of the hydrogen generator according to Embodiment 4 of the present invention, an additional hardware configuration for driving the hydrogen generator, and the basic operation of the hydrogen generator are the same as those of Embodiments 1 to 3. Therefore, explanations thereof are omitted in Embodiment 4 of the present invention.

The characteristic operation of the hydrogen generator 100a of the present embodiment will be explained as another operation obtained by suitably combining the characteristic operation of the hydrogen generator 100a of Embodiment 1 and the characteristic operation of the hydrogen generator 100a of Embodiment 2.

To be specific, for example, the upper limit temperature Tu and the lower limit temperature Tl of the temperature detected by the temperature detector portion 3b are preset, and the upper limit supply amount and the lower limit supply amount of the supply amount of the air supplied from the combustion air supplying unit 11 to the heater portion 1 are also preset. Then, when the temperature detected by the temperature detector portion 3b is not less than the upper limit temperature Tu, and the supply amount of the air supplied from the combustion air supplying unit 11 to the heater portion 1 is not more than the lower limit supply amount, the supply amount of the water supplied from the water supplying unit 9 to the preheat evaporator portion 6 is increased. Moreover, for example, when the temperature detected by the temperature detector portion 3b is not more than the lower limit temperature Tl, and the supply amount of the air supplied from the combustion air supplying unit 11 to the heater portion 1 is not less than the upper limit supply amount, the supply amount of the water supplied from the water supplying unit 9 to the preheat evaporator portion 6 is decreased. By this characteristic operation, the temperature of the shift catalyst 3a of the shift converter portion 3 is appropriately controlled to the optimal temperature.

The difference between the characteristic operation of the hydrogen generator 100a of the present embodiment and the characteristic operation of the hydrogen generator 100a of Embodiment 3 is that the setting of the upper limit supply amount and the lower limit supply amount of the supply amount of the air supplied from the combustion air supplying unit 11 to the heater portion 1 is prioritized. With this, it is possible to preferentially avoid problems associated with the operation of the heater portion 1, such as the increase in the concentration of the carbon monoxide contained in the combustion gas when the supply amount of the air is small, the increase in the concentration of the carbon monoxide contained in the combustion gas when the supply amount of the air is large, and the increase in the heat energy taken out by the combustion gas to an outside of the hydrogen generator 100a.

Here, in a case where the difference between the upper limit supply amount and the lower limit supply amount of the supply amount of the air supplied from the combustion air supplying unit 11 to the heater portion 1 is large, when the supply amount of the air supplied to the heater portion 1 is small, incomplete combustion is generated, and the concentration of the carbon monoxide contained in the combustion gas increases. Moreover, when the supply amount of the air supplied to the heater portion 1 is large, the combustion becomes unstable, and the concentration of the carbon monoxide contained in the combustion gas increases. Or, the heat energy taken out by the combustion gas to the outside of the hydrogen generator 100a increases, so that the efficiency of generating the hydrogen in the hydrogen generator 100a deteriorates.

In accordance with the present embodiment, the temperature of the shift catalyst 3a of the shift converter portion 3 is controlled by two control factors which are the first control factor of whether the supply amount of the water supplied from the water supplying unit 9 to the preheat evaporator portion 6 is increased or decreased and the second control factor of whether the supply amount of the air supplied from the combustion air supplying unit 11 to the heater portion 1 is increased or decreased. Therefore, it is possible to suppress the difference (that is, a variation range of the supply amount of the air) between the upper limit supply amount and the lower limit supply amount of the supply amount of the air. Moreover, since it is possible to suppress the difference between the upper limit supply amount and the lower limit supply amount, it is possible to especially stabilize the temperature of the reforming catalyst 2a of the reformer portion 2. In addition, it is possible to adequately secure controllability of the temperature of the shift catalyst 3a of the shift converter portion 3.

In a case where the variation range of the supply amount of the air supplied from the combustion air supplying unit 11 to the heater portion 1 is set to be narrow, the control range of the temperature of the shift catalyst 3a of the shift converter portion 3 becomes narrow. However, even when the temperature of the shift catalyst 3a of the shift converter portion 3 is outside the control range, it can be controlled by controlling the supply amount of the water supplied from the water supplying unit 9 to the preheat evaporator portion 6. As a result, it is possible to suppress the probability of the generation of the carbon monoxide in the shift converter portion 3 and control the operating temperatures of the carbon monoxide removing portions to further appropriate operating temperatures.

Other than these points, Embodiment 4 is the same as Embodiments 1 to 3.

As above, in the hydrogen generator according to the embodiments of the present invention, the upper limit temperature and the lower limit temperature of the temperature detected by the temperature detector portion which detects the temperature of the shift converter portion are preset, and when the temperature detected by the temperature detector portion is not less than the upper limit temperature, the supply amount of the water supplied from the water supplying unit to the preheat evaporator portion is increased to increase the amount of the necessary evaporative latent heat in the preheat evaporator portion. With this, since the amount of the heat transferred to the preheat evaporator portion side from the hydrogen-containing gas discharged from the reformer portion increases, the temperature of the hydrogen-containing gas supplied to the shift converter portion decreases. Thus, it is possible to decrease the temperature of the shift catalyst of the shift converter portion. In contrast, when the temperature detected by the temperature detector portion is not more than the lower limit temperature, the supply amount of the water supplied from the water supplying unit to the preheat evaporator portion is decreased to decrease the amount of the necessary evaporative latent heat in the preheat evaporator portion. With this, since the amount of the heat transferred to the preheat evaporator portion side from the hydrogen-containing gas discharged from the reformer portion decreases, the temperature of the hydrogen-containing gas supplied to the shift converter portion increases. Thus, it is possible to increase the temperature of the shift catalyst of the shift converter portion. By these control operations, it is possible to appropriately control the temperature of the shift catalyst of the shift converter portion.

Moreover, in accordance with the hydrogen generator according to the embodiments of the present invention, the upper limit supply amount and the lower limit supply amount of the supply amount of the water supplied from the water supplying unit to the preheat evaporator portion are preset, and when the temperature detected by the temperature detector portion is not less than the upper limit temperature, and the supply amount of the water supplied from the water supplying unit to the preheat evaporator portion is not less than the upper limit supply amount, or when the temperature detected by the temperature detector portion is not more than the lower limit temperature, and the supply amount of the water supplied from the water supplying unit to the preheat evaporator portion is not more than the lower limit supply amount, it can be determined that the operation of the hydrogen generator is abnormal. Here, in the hydrogen generator configured by integrating the carbon monoxide removing portions, such as the reformer portion, the shift converter portion, and the selective oxidizer portion, since the amount of the heat exchange at the preheat evaporator portion is determined by the supply amount of the water, a temperature balance among the reaction portions is approximately constant. Therefore, by setting the upper limit temperature and the lower limit temperature of the temperature detected by the temperature detector portion within such a range that no problem occurs in the operation of the hydrogen generator, it is possible to determine whether or not the supply amount of the water supplied to the preheat evaporator portion is within the assumed range, and determine abnormality outside the assumed range in the hydrogen generator.

Moreover, the upper limit temperature and the lower limit temperature of the temperature detected by the temperature detector portion are preset, and when the temperature detected by the temperature detector portion is not less than the upper limit temperature, the supply amount of the combustion air supplied to the heater portion is decreased. With this, it is possible to reduce the amount of the heat transferred from the heater portion to the preheat evaporator portion disposed outside the heater portion. In this case, since the amount of the necessary evaporative latent heat necessary in the preheat evaporator portion is constant, the amount of the heat transferred to the preheat evaporator portion side from the hydrogen-containing gas discharged from the reformer portion increases, and the temperature of the hydrogen-containing gas supplied to the shift converter portion decreases. With this, it is possible to decrease the temperature of the shift catalyst of the shift converter portion. Moreover, when the temperature detected by the temperature detector portion is not more than the lower limit temperature, the supply amount of the combustion air supplied to the heater portion is increased to increase the amount of the heat transferred from the heater portion to the preheat evaporator portion disposed outside the heater portion. In this case, since the amount of the necessary evaporative latent heat necessary in the preheat evaporator portion is constant, the amount of the heat transferred to the preheat evaporator portion side from the hydrogen-containing gas discharged from the reformer portion decreases, and the temperature of the hydrogen-containing gas supplied to the shift converter portion increases. With this, it is possible to increase the temperature of the shift catalyst of the shift converter portion.

Moreover, the upper limit supply amount and the lower limit supply amount of the supply amount of the air supplied from the combustion air supplying unit to the heater portion are preset, and when the temperature detected by the temperature detector portion is not less than the upper limit temperature, and the supply amount of the air supplied from the combustion air supplying unit to the heater portion is not more than the lower limit supply amount, or when the temperature detected by the temperature detector portion is not more than the lower limit temperature, and the supply amount of the air supplied from the combustion air supplying unit to the heater portion is not less than the upper limit supply amount, it can be determined that the operation of the hydrogen generator is abnormal. Here, in the hydrogen generator configured by integrating the carbon monoxide removing portions, such as the reformer portion, the shift converter portion, and the selective oxidizer portion, since the amount of the heat exchange at the heater portion is determined when the supply amount of the water and the supply amount of the raw material are stable, the temperature balance among the reaction portions is approximately constant. Therefore, by setting the upper limit temperature and the lower limit temperature of the temperature detected by the temperature detector portion within such a range that no problem occurs in the operation of the hydrogen generator, it is possible to determine whether or not the operation of the combustion air supplying unit is within the assumed range, and determine abnormality outside the assumed range in the hydrogen generator.

Moreover, the upper limit supply amount and the lower limit supply amount of the supply amount of the water supplied from the water supplying unit to the preheat evaporator portion are preset, and when the temperature detected by the temperature detector portion is not less than the upper limit temperature, and the supply amount of the water supplied from the water supplying unit to the preheat evaporator portion is not less than the upper limit supply amount, the supply amount of the combustion air supplied from the combustion air supplying unit to the heater portion is decreased. Or, when the temperature detected by the temperature detector portion is not more than the lower limit temperature, and the supply amount of the water supplied from the water supplying unit to the preheat evaporator portion is not more than the lower limit supply amount, the supply amount of the combustion air supplied from the combustion air supplying unit to the heater portion is increased. Since the temperature of the shift catalyst of the shift converter portion is controlled by the above two control factors, the upper limit supply amount and the lower limit supply amount can be set without any difficulty. Moreover, it is possible to reduce the probability of the generation of the carbon monoxide in the carbon monoxide removing portion and control the operating temperature of the carbon monoxide removing portion to the optimal operating temperature. Then, by using these control operations and the operation of adjusting the combustion at the heater portion such that the temperature detected by the temperature detector portion which detects the temperature of the reforming catalyst becomes a preset temperature, it is also possible to stabilize the steam-reforming reaction in the reformer portion. Therefore, it is possible to most appropriately operate the hydrogen generator.

Moreover, the upper limit supply amount and the lower limit supply amount of the supply amount of the air supplied from the combustion air supplying unit to the heater portion are preset, and when the temperature detected by the temperature detector portion is not less than the upper limit temperature, and the supply amount of the air supplied from the combustion air supplying unit to the heater portion is not more than the lower limit supply amount, the supply amount of the water supplied from the water supplying unit to the preheat evaporator portion is increased. Or, when the temperature detected by the temperature detector portion is not more than the lower limit temperature, and the supply amount of the air supplied from the combustion air supplying unit to the heater portion is not less than the upper limit supply amount, the supply amount of the water supplied from the water supplying unit to the preheat evaporator portion is decreased. Since the temperature of the shift catalyst of the shift converter portion is controlled by the above two control factors, the upper limit supply amount and the lower limit supply amount can be set without any difficulty. Moreover, it is possible to reduce the probability of the generation of the carbon monoxide in the carbon monoxide removing portion and control the operating temperature of the carbon monoxide removing portion to the optimal operating temperature.

Moreover, by supplying the raw material and the water from above the preheat evaporator portion in the direction of gravitational force, it is possible to suppress the pressure variation generated when evaporating the water in the preheat evaporator portion, and smoothly supply the raw material and the water to the reformer portion.

Moreover, in a case where the carbon monoxide removing portion is the shift converter portion, the temperature of the shift catalyst of the shift converter portion can be stabilized by disposing in the shift converter portion the temperature detector portion which detects the temperature of the shift catalyst. With this, without increasing the supply amount of the air supplied to the selective oxidizer portion, it is possible to supply to the fuel cell the high-quality hydrogen-containing gas which is adequately reduced in the concentration of the carbon monoxide.

In accordance with the present invention, in the hydrogen generator which generates the hydrogen-containing gas with a comparatively simple configuration by the steam-reforming reaction between the material gas and the water and is configured by placing the carbon monoxide removing portions, such as the reformer portion, the shift converter portion, and the selective oxidizer portion, around the heater portion in a cylindrical manner and integrating them, the temperature of the shift catalyst of the shift converter portion can be appropriately controlled without disposing a special temperature control mechanism. Moreover, since the temperature control mechanism, such as the air-cooling fan, is not required, it is possible to configure the hydrogen generator which does not increase the amount of heat radiation. Moreover, it is possible to realize both the simplification of the configuration of the hydrogen generator and the high efficiency of generating the hydrogen without deteriorating the efficiency of generating the hydrogen which efficiency is required in the hydrogen generator.

INDUSTRIAL APPLICABILITY

The hydrogen generator according to the present invention is industrially applicable as a hydrogen generator by which since the liquid water supplied from the preheat evaporator is trapped by the water trapping portion, the possibility of occurrence of the inhibition of the reforming reaction and the destruction of the catalyst, which are caused since the liquid water is directly supplied to the reforming catalyst filled in the reformer and the reforming catalyst is locally and rapidly cooled down, is reduced, so that the hydrogen can be generated stably.

Moreover, the fuel cell system including the hydrogen generator according to the present invention is industrially applicable as a fuel cell system by which the hydrogen generator stably operates, the high-quality hydrogen-containing gas having a stable composition is stably supplied to the fuel cell, and the electric power generating operation can be stably carried out.

The invention claimed is:

1. A hydrogen generator comprising:
    a heater which combusts a mixture gas of combustion fuel and combustion air to generate a combustion gas;
    an annular preheat evaporator which heats a raw material and water by the combustion gas generated by said heater to generate a mixture gas of the raw material and steam;
    an annular reformer, the entirety of which is disposed under said preheat evaporator and which generates a hydrogen-containing gas by causing the mixture gas generated by said preheat evaporator to pass through a reforming catalyst heated by the combustion gas; and
    a water trapping portion which is located between said preheat evaporator and said reformer and traps liquid water discharged from said preheat evaporator.

2. The hydrogen generator according to claim 1, further comprising an annular shift converter which is disposed around an outer periphery of said preheat evaporator and contains a shift catalyst which reduces, by a shift reaction, carbon monoxide contained in the hydrogen-containing gas generated by said reformer, wherein
    said water trapping portion is disposed adjacent to a gas passage of the hydrogen-containing gas from said reformer to said shift converter so that heat is exchanged between the hydrogen-containing gas supplied from said reformer to said shift converter and the liquid water in said water trapping portion.

3. The hydrogen generator according to claim 2, wherein:
    each of said preheat evaporator, said water trapping portion, said reformer, and said shift converter is disposed outside said heater so as to have a tubular shape,
    said shift converter is disposed to surround said preheat evaporator,
    said preheat evaporator, said water trapping portion, and said reformer are connected to one another such that the mixture gas is supplied from said preheat evaporator through said water trapping portion to said reformer, and
    heat is exchanged between the hydrogen-containing gas supplied from said reformer to said shift converter and the liquid water in said water trapping portion via a wall between said gas passage and said water trapping portion.

4. The hydrogen generator according to claim 3, wherein a supply port of the raw material and a supply port of the water are disposed at one end of said preheat evaporator which is opposite to another end to which said water trapping portion is connected.

5. The hydrogen generator according to claim 2, further comprising:
    a combustion air supplying unit which supplies the combustion air to said heater;
    a water supplying unit which supplies the water to said preheat evaporator;
    a temperature detector which detects a temperature of the shift catalyst incorporated in said shift converter; and
    a control unit, wherein
    said control unit controls, based on the temperature of the shift catalyst detected by said temperature detector, at least one of a supply amount of the water supplied from said water supplying unit to said preheat evaporator and a supply amount of the combustion air supplied from said combustion air supplying unit to said heater.

6. The hydrogen generator according to claim 5, further comprising a storage unit which contains information regarding an upper limit temperature and a lower limit temperature associated with temperature control of the shift catalyst, wherein said control unit causes said water supplying unit to increase the supply amount of the water supplied to said preheat evaporator when the temperature detected by said temperature detector becomes the upper limit temperature or more, and causes said water supplying unit to decrease the supply amount of the water supplied to said preheat evaporator when the temperature detected by said temperature detector becomes the lower limit temperature or less.

7. The hydrogen generator according to claim 6, wherein:
said storage unit further contains information regarding an upper limit supply amount and a lower limit supply amount associated with control of the supply amount of the water; and
said control unit determines that an abnormality has occurred when the supply amount of the water supplied from said water supplying unit to said preheat evaporator becomes the upper limit supply amount or more or when the supply amount of the water supplied from said water supplying unit to said preheat evaporator becomes the lower limit supply amount or less.

8. The hydrogen generator according to claim 5, further comprising a storage unit which contains information regarding an upper limit temperature and a lower limit temperature associated with temperature control of the shift catalyst, wherein said control unit causes said combustion air supplying unit to decrease the supply amount of the combustion air supplied to said heater when the temperature detected by said temperature detector is not less than the upper limit temperature, and causes said combustion air supplying unit to increase the supply amount of the combustion air supplied to said heater when the temperature detected by said temperature detector is not more than the lower limit temperature.

9. The hydrogen generator according to claim 8, wherein:
said storage unit further contains information regarding an upper limit supply amount and a lower limit supply amount associated with control of the supply amount of the combustion air; and
said control unit determines that an abnormality has occurred when the supply amount of the combustion air supplied from said combustion air supplying unit to said heater becomes the upper limit supply amount or more or when the supply amount of the combustion air supplied from said combustion air supplying unit to said heater becomes the lower limit supply amount or less.

10. The hydrogen generator according to claim 5, further comprising a storage unit which contains information regarding an upper limit temperature and a lower limit temperature associated with temperature control of the shift catalyst and information regarding an upper limit supply amount and a lower limit supply amount associated with control of the supply amount of the water, wherein said control unit causes said combustion air supplying unit to decrease the supply amount of the combustion air supplied to said heater when the temperature of the shift catalyst is not less than the upper limit temperature and the supply amount of the water supplied from said water supplying unit to said preheat evaporator is not less than the upper limit supply amount, and causes said combustion air supplying unit to increase the supply amount of the combustion air supplied to said heater when the temperature of the shift catalyst is not more than the lower limit temperature and the supply amount of the water supplied from said water supplying unit to said preheat evaporator is not more than the lower limit supply amount.

11. The hydrogen generator according to claim 5, further comprising a storage unit which contains information regarding an upper limit temperature and a lower limit temperature associated with temperature control of the shift catalyst and information regarding an upper limit supply amount and a lower limit supply amount associated with control of the supply amount of the combustion air, wherein said control unit causes said water supplying unit to increase the supply amount of the water supplied to said preheat evaporator when the temperature of the shift catalyst is not less than the upper limit temperature and the supply amount of the combustion air supplied from said combustion air supplying unit to said heater is not more than the lower limit supply amount, and causes said water supplying unit to decrease the supply amount of the water supplied to said preheat evaporator when the temperature of the shift catalyst is not more than the lower limit temperature and the supply amount of the combustion air supplied from said combustion air supplying unit to said heater is not less than the upper limit supply amount.

12. A fuel cell system comprising at least:
a hydrogen generator; and
a fuel cell which generates electric power using the hydrogen-containing gas supplied from the hydrogen generator and an oxygen-containing gas,
wherein said hydrogen generator comprises:
a heater which combusts a mixture gas of combustion fuel and combustion air to generate a combustion gas;
an annular preheat evaporator which heats a raw material and water by the combustion gas generated by said heater to generate a mixture gas of the raw material and steam;
an annular reformer, the entirety of which is disposed under said preheat evaporator and which generates a hydrogen-containing gas by causing the mixture gas generated by said preheat evaporator to pass through a reforming catalyst heated by the combustion gas; and
a water trapping portion which is located between said preheat evaporator and said reformer and traps liquid water discharged from said preheat evaporator.

* * * * *